US012579484B2

(12) United States Patent
Young et al.

(10) Patent No.: US 12,579,484 B2
(45) Date of Patent: Mar. 17, 2026

(54) INTELLIGENTLY CUSTOMIZING A CANCELLATION NOTICE FOR CANCELLATION OF A TRANSPORTATION REQUEST BASED ON TRANSPORTATION FEATURES

(71) Applicant: Lyft, Inc., San Francisco, CA (US)

(72) Inventors: Jimmy Young, San Francisco, CA (US); Mohammad Ali Motie Share, San Francisco, CA (US); Humboldt Jayme Ramirez, Vallejo, CA (US); Alex Collier Mazure, IV, San Francisco, CA (US); Bao Kham Chau, Oakland, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 18/645,145

(22) Filed: Apr. 24, 2024

(65) Prior Publication Data

US 2024/0273422 A1     Aug. 15, 2024

Related U.S. Application Data

(63) Continuation of application No. 16/681,178, filed on Nov. 12, 2019, now Pat. No. 11,989,669.

(51) Int. Cl.
G06Q 10/02          (2012.01)
G06N 20/00          (2019.01)
(Continued)

(52) U.S. Cl.
CPC ............. *G06Q 10/02* (2013.01); *G06N 20/00* (2019.01); *G06Q 50/40* (2024.01); *G06Q 50/47* (2024.01)

(58) Field of Classification Search
CPC ........ G06Q 10/02; G06Q 50/40; G06Q 50/47; G06N 20/00
(Continued)

(56) References Cited

U.S. PATENT DOCUMENTS 9,807,547 B1     10/2017  Oesterling et al.
10,248,913 B1     4/2019  Gururajan et al.
(Continued)

OTHER PUBLICATIONS

John, Steven; "How to cancel an Uber ride, whether you've just ordered it or scheduled it in advance"; Business Insider https://www.businessinsider.com/guides/tech/how-to-cancel-uber; Jul. 30, 2019. (Year: 2019).*
(Continued)

*Primary Examiner* — Dione N. Simpson
(74) *Attorney, Agent, or Firm* — Keller Preece PLLC

(57) ABSTRACT

The present disclosure relates to systems, non-transitory computer-readable media, and methods for intelligently determining to assess (or not assess) a cancellation penalty and notifying a requestor device of such a penalty in response to either a requestor's selection to cancel a single transportation request for a requestor or a requestor's selection to cancel a shared-transportation request associated with multiple requestors. For example, the disclosed systems can generate conversion probabilities for a requestor reflecting if a cancellation penalty is assessed—and if the cancellation penalty is not assessed—for a cancellation of a transportation request for transport of a lone requestor. Based on the conversion probabilities, the disclosed systems customize a cancellation notice for a requestor device to either include or exclude the cancellation penalty.

20 Claims, 19 Drawing Sheets

(51) Int. Cl.
  *G06Q 50/40* (2024.01)
  *G06Q 50/47* (2024.01)
(58) Field of Classification Search
  USPC ............................................................ 705/5
  See application file for complete search history.

(56) References Cited

U.S. PATENT DOCUMENTS

| | | | |
|---|---|---|---|
| 11,548,533 | B2 | 1/2023 | Liang et al. |
| 11,631,027 | B2 | 4/2023 | Fu et al. |
| 2010/0153279 | A1 | 6/2010 | Zahn |
| 2011/0153629 | A1 | 6/2011 | Lehmann et al. |
| 2012/0054642 | A1 | 3/2012 | Balsiger et al. |
| 2013/0018651 | A1 | 1/2013 | Djordjevic et al. |
| 2013/0054281 | A1 | 2/2013 | Thakkar et al. |
| 2017/0138749 | A1 | 5/2017 | Pan et al. |
| 2017/0147941 | A1 | 5/2017 | Bauer et al. |
| 2017/0200321 | A1 | 7/2017 | Hummel et al. |
| 2018/0342035 | A1 | 11/2018 | Sweeney et al. |
| 2019/0329790 | A1* | 10/2019 | Nandakumar ......... G06N 3/084 |
| 2020/0013135 | A1 | 1/2020 | Kodesh et al. |
| 2020/0250196 | A1* | 8/2020 | Goldstein ......... G06F 16/24578 |
| 2021/0081880 | A1 | 3/2021 | Bivins |
| 2021/0142229 | A1 | 5/2021 | Young et al. |
| 2021/0142243 | A1 | 5/2021 | Young et al. |
| 2022/0230110 | A1* | 7/2022 | Tsukamoto ........ G01C 21/3415 |

OTHER PUBLICATIONS

John, Steven; "How to cancel an Uber ride, whether you've just ordered it or scheduled it in advance"; Business Insider https://www.businessinsider.com/guides/tech/how-to-cancel-uJbuelyr 30, 2019. (Year: 2019).

Kumar, Johnny; McKeown, Jennifer; Shiang, Catherine; Ex Parte Hunnan, 2019, Patent Trial and Appeal Board, 1-13 (Year: 2019).

U.S. Appl. No. 16/681,178, filed Dec. 5, 2022, Office Action.

U.S. Appl. No. 16/681,178, filed May 12, 2023, Office Action.

U.S. Appl. No. 16/681,178, filed Oct. 11, 2023, Office Action.

U.S. Appl. No. 16/681,178, filed Jan. 23, 2024, Notice of Allowance.

U.S. Appl. No. 16/681,185, Dec. 9 ,2022, Office Action.

U.S. Appl. No. 16/681,185, filed May 24, 2023, Office Action.

U.S. Appl. No. 16/681,185, filed Nov. 1, 2023, Office Action.

U.S. Appl. No. 16/681,185, filed May 8, 2024, Office Action.

* cited by examiner 702
704f
718

Arrives in 3 Minutes

Sarah

Ford Focus

☆☆☆☆☆

Edit Ride     Share Location     Contact 702
704e
716

Sarah is on the way. The next driver is 8 minutes away.

Cancel this ride?

Call Driver

Edit Pickup Spot

Cancel Ride

Don't cancel ride

Edit Ride

900

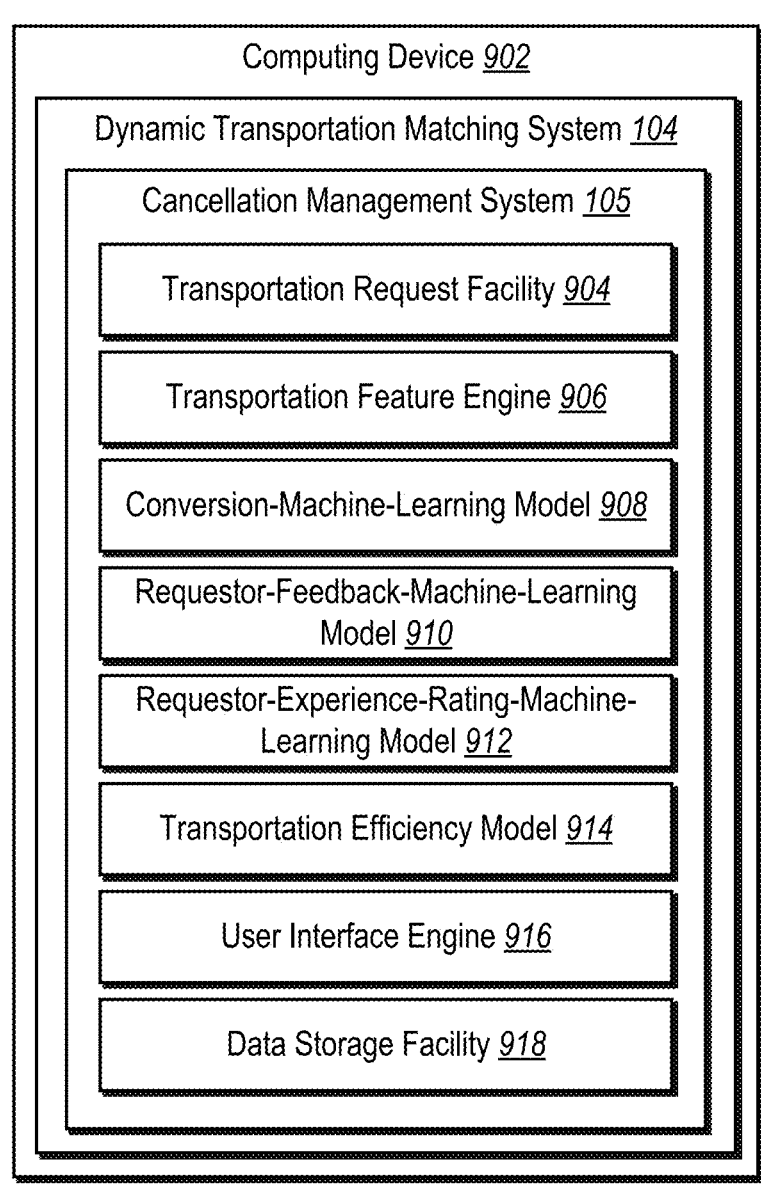

Computing Device *902*

Dynamic Transportation Matching System *104*

Cancellation Management System *105*

Transportation Request Facility *904*

Transportation Feature Engine *906*

Conversion-Machine-Learning Model *908*

Requestor-Feedback-Machine-Learning Model *910*

Requestor-Experience-Rating-Machine-Learning Model *912*

Transportation Efficiency Model *914*

User Interface Engine *916*

Data Storage Facility *918*

1000b

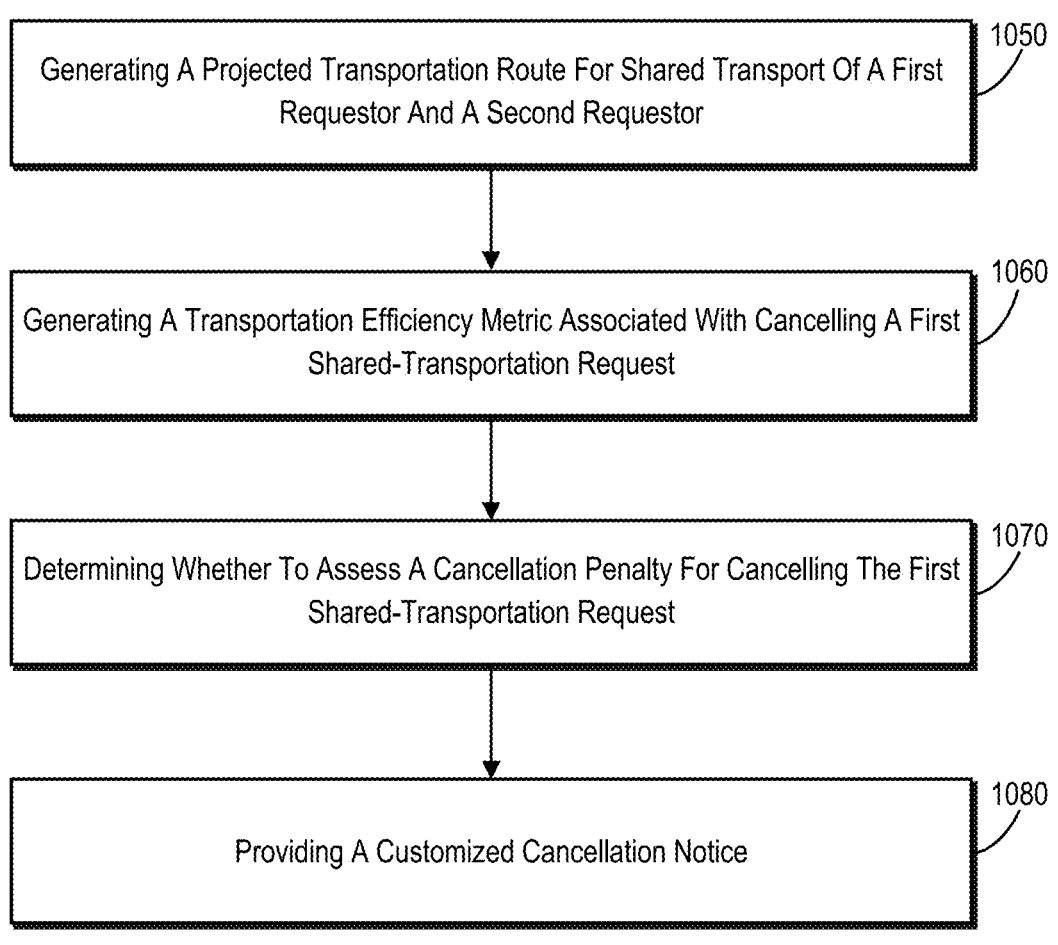

Generating A Projected Transportation Route For Shared Transport Of A First Requestor And A Second Requestor                    1050

Generating A Transportation Efficiency Metric Associated With Cancelling A First Shared-Transportation Request                    1060

Determining Whether To Assess A Cancellation Penalty For Cancelling The First Shared-Transportation Request                    1070

Providing A Customized Cancellation Notice                    1080

INTELLIGENTLY CUSTOMIZING A CANCELLATION NOTICE FOR CANCELLATION OF A TRANSPORTATION REQUEST BASED ON TRANSPORTATION FEATURES

CROSS-REFERENCE TO RELATED APPLICATIONS

The present application is a continuation of U.S. application Ser. No. 16/681,178, filed on Nov. 12, 2019. The aforementioned application is hereby incorporated by reference in its entirety.

BACKGROUND

Transportation matching systems commonly use web and mobile applications to manage on-demand requests for transportation from providers. By using such web and mobile applications, on-demand transportation matching systems pair providers with requestors to transport such requestors from a pickup location to a drop-off location. Beyond single-requestor transports, some on-demand transportation matching systems pair multiple requestors with a provider for shared transport to different (or the same) destination locations. To pair multiple requestors in a shared transport, on-demand transportation matching systems must often determine projected routes for transport by one or more provider vehicles in real (or near-real) time.

Despite improving the computing processes for matching transportation requestors with transportation providers, conventional on-demand transportation matching systems lack the computational speed and computational models to efficiently analyze cancellations of transportation requests, particularly in real (or near-real) time. For example, conventional on-demand transportation matching systems often cannot efficiently determine to assess cancellation penalties upon detecting a cancellation of a request in real (or approximately real) time. By using computational heuristics, conventional on-demand transportation matching systems inaccurately apply or waive cancellation penalties to requestors without analyzing factors related to a corresponding transportation request. Consequently, conventional on-demand transportation matching systems inefficiently determine to apply or waive cancellation penalties that can increase computing communications between the transportation matching systems and provider computing devices and can waste computational resources in re-routing provider vehicles from cancelled routes.

In addition to the limits of existing computational models for single-requestor transportations, conventional transportation matching systems often compound the inaccuracies and inefficiencies of cancellation penalties when matching requestors and providers for shared transportations. Because a cancellation of a shared transportation can affect one or both of multiple requestors and providers, conventional transportation matching systems musts often determine how to re-route and/or re-match transportation providers and requestors on short notice. By failing to account for alternative routes and pairings for providers with requestors in real (or near-real) time, conventional transportation matching systems often cannot efficiently process cancellations of shared-transportation requests and assess or waive corresponding cancellation penalties.

SUMMARY

This disclosure describes one or more embodiments of methods, non-transitory computer-readable media, and systems that solve the foregoing problems in addition to providing other benefits. In particular, the disclosed systems intelligently determine to assess (or not assess) a cancellation penalty and notify a requestor device of such a penalty in response to either a requestor's selection to cancel a single transportation request for a requestor or a requestor's selection to cancel a shared-transportation request associated with multiple requestors. For example, the disclosed systems can generate conversion probabilities for a requestor reflecting if a cancellation penalty is assessed—and if the cancellation penalty is not assessed—for a cancellation of a transportation request for transport of a lone requestor. Based on the conversion probabilities, the disclosed systems customize a cancellation notice for a requestor device to either include or exclude the cancellation penalty. Additionally, or alternatively, in certain implementations, the disclosed systems generate a transportation efficiency metric for modifying a projected transportation route for a shared transportation to account for a cancellation of a shared-transportation request. Based on the transportation efficiency metric, the disclosed systems customize a cancellation notice for a requestor device to either include or exclude the cancellation penalty.

BRIEF DESCRIPTION OF THE DRAWINGS

The detailed description refers to the drawings briefly described below.

FIG. 9 illustrates a schematic diagram of a cancellation management system in accordance with one or more embodiments.

FIGS. 10A-10B respectively illustrate a flowchart of a series of acts in methods of providing a customized cancellation notice in accordance with one or more embodiments.

DETAILED DESCRIPTION

Figure 1:
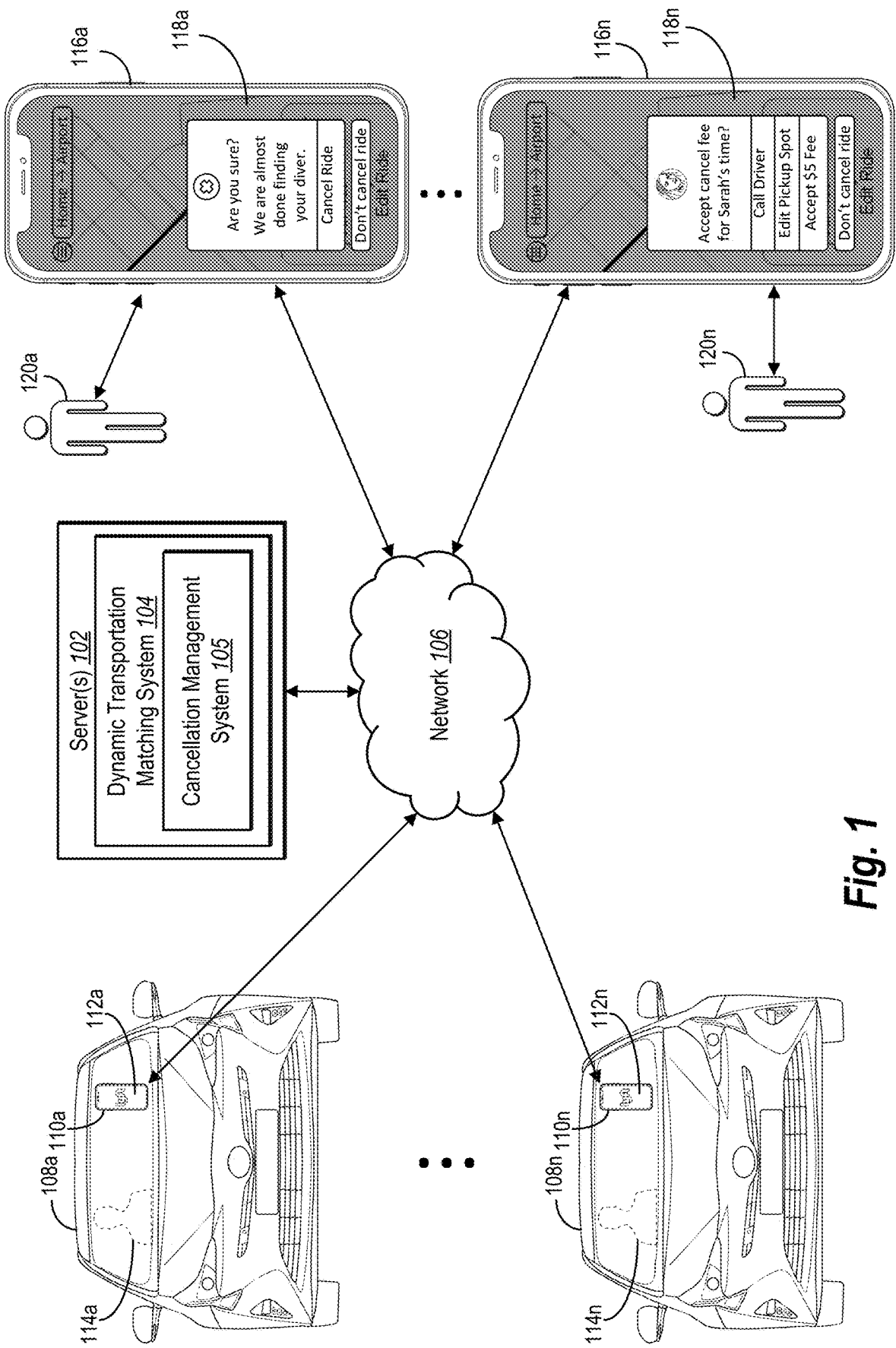
FIG. 1 illustrates a block diagram of an environment for implementing a cancellation management system in accordance with one or more embodiments.

This disclosure describes one or more embodiments of a cancellation management system that intelligently determines to assess (or not assess) a cancellation penalty and notify a requestor device of such a penalty in response to either a requestor's selection to cancel a single transportation request for a requestor or a requestor's selection to cancel a shared-transportation request associated with multiple requestors. For example, in some embodiments, the cancellation management system generates conversion probabilities for a requestor reflecting if a cancellation penalty is assessed—and if the cancellation penalty is not assessed—for a cancellation of a transportation request for transport of a lone requestor. Based on the conversion probabilities, the cancellation management system customizes a cancellation notice for a requestor device to either include or exclude the cancellation penalty. Additionally, or alternatively, in certain implementations, the cancellation management system generates a transportation efficiency metric for modifying a projected transportation route for a shared transportation to account for a cancellation of a shared-transportation request. Based on the transportation efficiency metric, the cancellation management system customizes a cancellation notice for a requestor device to either include or exclude the cancellation penalty.

As suggested above, in some cases, the cancellation management system receives a transportation request from a requestor device from a single requestor. Based on transportation features corresponding to the transportation request, the cancellation management system generates (i) a first conversion probability associated with assessing or showing a cancellation penalty for cancelling the transportation request and (ii) a second conversion probability associated with not assessing or not showing the cancellation penalty for cancelling the transportation request. Based on the first and second conversion probabilities, the cancellation management system determines whether to assess the cancellation penalty for cancelling the transportation request. In response to receiving a requestor's selection to cancel the transportation request, the cancellation management system provides a customized cancellation notice for display by the requestor device—either including or excluding the cancellation penalty.

To generate such conversion probabilities, in some cases, the cancellation management system analyzes transportation features corresponding to a transportation request. To name but a few examples of such transportation features, the cancellation management system can generate conversion probabilities based on (i) an estimated time of arrival of a transportation provider at a pickup location of a requestor, (ii) an amount of time between the transportation provider accepting the transportation request and the requestor cancelling the transportation request, or (iii) a distance between the requestor device and the pickup location. By analyzing one or more such transportation features utilizing a conversion-machine-learning model, in some implementations, the cancellation management system applies the conversionmachine-learning model to generate the first conversion probability and the second conversion probability.

By analyzing such transportation features, the cancellation management system can generate different probabilities of conversion for a requestor accounting for if a cancelation penalty is assessed and if the cancellation penalty is not assessed in response to a transportation-request cancellation. In some cases, for instance, the cancellation management system generates conversion probabilities that a transportation provider transports a requestor to a drop-off location (e.g., finishes a requested ride) based on an initial (or subsequent) transportation request sent by the requestor within a threshold time period. Such conversion probabilities can accordingly represent requestor-session-conversion probabilities for a single requestor reflecting a probability if a cancellation penalty is assessed and a probability if the cancellation penalty is not assessed for a transportation-request cancellation.

After determining whether to assess a cancellation penalty, the cancellation management system customizes a cancellation notice for display by a requestor device. Based on conversion probabilities particular to a transportation request, in some embodiments, the cancellation management system notifies the requestor device that a cancellation penalty will be assessed for cancelling the transportation request. By contrast, based on conversion probabilities particular to a different transportation request, in some embodiments, the cancellation management system notifies the requestor device that no cancellation penalty will be assessed for cancelling the transportation request.

In addition to generating conversion probabilities, in certain implementations, the cancellation management system also predicts or generates a feedback probability that a requestor corresponding to a transportation request submits feedback in response to a cancellation penalty. Such feedback may result in opening a help ticket, providing assistance through virtual or real agents. To generate such a feedback probability, in some cases, the cancellation management system applies a requestor-feedback-machine-learning model to one or more transportation features corresponding to a transportation request and outputs such a feedback probability. The cancellation management system can accordingly use both conversion probabilities and a feedback probability for determining whether to assess a cancellation penalty and how to customize a cancellation notice.

As further suggested above, the cancellation management system can also generate a transportation efficiency metric to determine whether to assess a cancellation penalty for cancellation of a shared-transportation request. For example, in some embodiments, the cancellation management system generates a projected transportation route for shared transport of a first requestor and a second requestor based on a first shared-transportation request and a second shared-transportation request. The cancellation management system further generates a transportation efficiency metric indicating an efficiency of modifying the projected transportation route if the first shared-transportation request is cancelled. For instance, a transportation efficient metric can reflect a difference in terms of loss or gain between using a projected transportation route and using a modified projected transportation route to transport the second requestor. Based on the transportation efficiency metric, the cancellation management system determines whether to assess the cancellation penalty for cancelling the first shared-transportation request. In response to receiving the first requestor's selection to cancel the first shared-transportation request, the cancellation management system provides a customized cancellation notice for display by a requestor device of the first requestor—either including or excluding the cancellation penalty.

To generate a transportation efficiency metric, in certain embodiments, the cancellation management system determines (i) a first projected value of a transportation provider transporting the first requestor and the second requestor along the projected transportation route and (ii) a second projected value of transporting the second requestor along an alternative projected transportation route. Such an alternative projected transportation route may include a route for transporting the second requestor alone (and without the first requestor) or a route for transporting the second requestor with a third requestor associated with an additional shared-transportation request.

In addition to determining a transportation efficiency metric corresponding to a shared-transportation request, the cancellation management system can also generate a predicted-requestor rating of an experience for the first requestor (e.g., a transportation experience or a transportation-request experience) based on transportation features corresponding to the first shared-transportation request. To name but a few examples of such transportation features, the cancellation management system can generate a predicted-requestor rating based on (i) an amount of time for matching the first shared-transportation request with a transportation provider, (ii) a predicted time or a predicted distance of detour for transport of the first requestor to a drop-off location, or (iii) an estimated time of arrival of the transportation provider at a pickup location of the first requestor. By analyzing one or more such transportation features utilizing a requestor-experience-rating-machine-learning model, in some implementations, the cancellation management system applies the requestor-experience-rating-machine-learning model to generate the predicted-requestor rating.

As described above, conventional transportation matching systems lack the computational speed and computational models to efficiently analyze cancellations of transportation requests. In particular, some conventional systems cannot intelligently determine whether to assess a cancellation penalty in real (or near-real) time. For example, some conventional systems cannot process the amount of data for real-time determinations of assessing a cancellation policy. Rather than analyze data in real (or near-real) time, some conventional transportation matching systems delay cancellation-penalty decisions until long after cancellation of a transportation request. For instance, some conventional systems merely inform a cancelling requestor that they might be charged a cancellation penalty if they cancel a transportation request.

In other cases, conventional systems may inform a cancelling requestor that they will be charged a cancellation penalty because a threshold amount of time has lapsed since submitting a transportation request. While a time-based rule can be implemented in real-time, a conventional system employing this approach fails to intelligently consider whether a cancellation penalty should be assessed based on various transportation features or (sometimes) account for resources expended by transportation vehicles or providers in adjusting to a cancelled transportation request.

Because conventional transportation matching systems lack efficient computational models for such real-time decisions, some conventional systems invoke heuristics as a simple, rule-based mechanism for enforcing cancellation penalties. But such heuristics can inaccurately enforce cancellation penalties/penalty waivers. By relying on heuristics, conventional transportation matching systems inaccurately apply or waive cancellation penalties to requestors without analyzing factors related to a corresponding transportation request. For instance, heuristic-based systems cannot determine interactions between different user experiences and therefore employ rudimentary means for determining whether a cancellation penalty should be assessed or waived. Indeed, heuristics are often binary rules that simply identify whether an event has or has not occurred, which event stands independent of other events, and often have unknown relationships to a user experience. Given these and other issues of heuristics, conventional systems that employ heuristics rest on unproved assumptions and cannot account for unknown inefficiencies and ineffectiveness (e.g., from assessing/waiving a cancellation penalty when inappropriate).

Because heuristics inaccurately apply or waive cancellation penalties, some conventional systems exchange excess communications to and/or from a transportation matching server for managing the re-routing and/or re-matching of transportation providers and requestors in response to a transportation-request cancellation. Given the increased number of affected entities with shared transportation, a shared transportation introduces a number of system complexities and inefficiencies. When a conventional system inaccurately determines to assess a cancellation penalty for cancelling a shared transportation, such systems often must unnecessarily coordinate transportation providers and other requestors or adjust transportation routes and corresponding transportation providers and requestors. When a conventional system inaccurately determines not to assess a cancellation penalty for cancelling a shared transportation, such systems often inefficiently project value for the shared transportation request. Accordingly, conventional systems can unnecessarily use computational resources to communicate remedial alternatives to transportation providers and requestors and misallocate provider resources to overvalued shared transportations.

In contrast to conventional systems, the cancellation management system provides advantages over conventional on-demand transportation matching systems. In particular, the cancellation management system can make intelligent, real-time determinations for assessing a cancellation penalty. For example, the cancellation management system can utilize trained machine-learning models capable of analyzing large amounts of data associated with real-time, intelligent determinations of assessing a cancellation penalty. Specifically, the cancellation management system can utilize a conversion-machine-learning model, a requestor-feedback-machine-learning model, and/or a requestor-experience-rating-machine-learning model to provide a customized cancellation notice to the requestor device based on transportation features uniquely associated with a transportation request and/or user experience of a requestor. In this manner, the cancellation management system can affirmatively inform the requestor of a cancellation penalty (or waiver) for cancelling the transportation request upon receiving from the requestor device an indication of a selection to edit the transportation request (e.g., modify, cancel, etc.).

Unlike conventional transportation matching systems, for example, the conversion-machine-learning model can generate conversion probabilities on the fly based on a variety of transportation features. Similarly, the requestor-experience-machine-learning model can generate predicted-requestor ratings on the fly based on a variety of transportation features. Likewise, the requestor-feedback-machine-learning model can extemporaneously generate feedback probabilities based on a variety of transportation features. By extemporaneously generating one or more of conversion probabilities, predicted-requestor ratings, or feedback probabilities, the cancellation management system can utilize machine-learning models to make an intelligent real-time (or near-real time) determinations for assessing a cancellation penalty.

As a further advantage, the cancellation management system more accurately determines to assess or not assess a cancellation penalty than conventional heuristics in terms of one or both of conversion and efficiency. Indeed, the cancellation management system can train the machine-learning models to weight transportation features and identify interactions between the transportation features to more accurately determine when the cancellation management system should assess or waive a cancellation penalty for cancelling a transportation request. For example, the cancellation management system can train the machine-learning model to identify various combinations of transportation features that are particularly distressing to requestors and that result in poor experience and/or a higher likelihood of cancellation, whereas alone such transportation features may not be as important or determinative. Thus, by utilizing a more data-driven approach and the above-mentioned machine-learning models, the cancellation management system can more accurately assess cancellation penalties based on transportation features with learned relationships to user experience, conversion, etc. described further below in relation to the figures.

In comparison to conventional transportation matching systems, for example, the cancellation management system can apply a conversion-machine-learning model to more accurately and effectively determine how likely a requestor will cancel or follow through with a transportation request in response to a cancellation penalty based on various transportation features. In turn, the conversion-machine-learning model can leverage the improved accuracy of conversion probabilities to increase conversions. For example, in testing, the conversion-machine-learning model has shown approximately a ten percent improvement in conversions (based on training from ground-truth data). Similarly, in comparison to conventional systems, the cancellation management system can apply a requestor-feedback-machine-learning model to more accurately determine how likely a requestor will initiate feedback in response to a cancellation penalty based on various transportation features. Likewise, in comparison to conventional systems, the cancellation management system can apply a requestor-experience-rating-machine-learning model to more accurately predict a user rating of a transportation experience based on various transportation features.

In addition to the foregoing advantages, the cancellation management system can decrease a number of communications to and/or from a dynamic transportation matching system for managing the re-routing and/or re-matching of transportation providers and requestors in response to cancellation of a shared-transportation request. In particular, the cancellation management system utilizes a transportation efficiency metric to decrease (or even avoid) the excess back-and-forth communications of conventional systems. By providing the customized cancellation notice to the requestor device based on the transportation efficiency metric, the cancellation management system can more accurately determine when to assess a cancellation penalty and thereby deter cancellation. In turn, the cancellation management system can decrease the excess back-and-forth communications associated with cancellation of a transportation request. Additionally, the cancellation management system can avoid lost value by efficiently determining when not to assess a cancellation penalty. Indeed, the cancellation management system can preemptively generate a transportation efficiency metric accounting for various ways in which the dynamic transportation matching system can increase or decrease the efficiency of transportation providers in traveling routes-due to cancellation of a shared-transportation request. Based on the extent of the cancellation impact (e.g., the value of the transportation efficiency metric), the cancellation management system can provide the cancellation penalty in a customized cancellation notice before the requestor confirms or cancels the transportation request.

As illustrated by the foregoing discussion, the present disclosure utilizes a variety of terms to describe features and advantages of the cancellation management system. For example, as used herein, the term "transportation request" refers to a request from a requesting individual (i.e., a requestor) for transport by a transportation vehicle. In particular, a transportation request includes a request by a requestor device or a transportation matching system for a transportation vehicle to transport a requestor or a group of individuals from one geographic area to another geographic area. The transportation request can include data associated with a requestor device, including a request location (e.g., a location from which the transportation request is initiated), a destination (e.g., a location to which the requestor wishes to travel), a pickup/drop-off location where a requestor can be respectively picked up for transportation and dropped off from transportation (which geographic areas may be the same as or different from the request location and destination), location profile information, a requestor rating, a travel history, a search history, etc. Additionally, or alternatively, a transportation request can include a request to be transported in certain manner (e.g., according to a service category type such as standard, premium, luxury, shared, shared saver, wheel-chair accessible, etc.).

Relatedly, the term "shared-transportation request" includes a request for shared transport of the requestor with at least one additional requestor. In particular, a shared-transportation request from a requestor can include a request for shared transportation with an additional requestor eligible to share transportation with the requestor at some point between a pickup location and a drop-off location for the requestor.

Additionally, as used herein, the term "cancellation penalty" refers to a penalty for cancelling a transportation request. In particular, a cancellation penalty can include some deduction in value assessed against a requestor for cancelling a transportation request when ineligible for a waiver as described herein. For example, a cancellation penalty can include a fee amount, a surcharge, a requestor rating loss, subscription rate increases, etc. In addition, the cancellation management system can present the cancellation penalty in a customized cancellation notice (e.g., a notification tailored to the requestor regarding cancellation of a transportation request) in response to receiving an indication of a selection to cancel the transportation request.

Further, as used herein, the term "conversion probability" refers to a likelihood that a transportation vehicle transports a requestor based on one or more transportation requests. In particular, a conversion probability reflects a probability that a transportation vehicle will transport a requestor to a destination or a drop-off location based on an initial or subsequent transportation request sent within a threshold time period. Such a probability may be expressed in a percentage or other value. As noted above, the cancellation management system may generate a set of conversion probabilities. For instance, a first conversion probability can reflect the likelihood a transportation vehicle transports the requestor if the cancellation penalty is assessed against (or presented to) the requestor. A second conversion probability can reflect the likelihood a transportation vehicle transports the requestor if the cancellation penalty is not assessed against (or not presented to) the requestor. Additionally, or alternatively, the cancellation management system may delineate between a conversion probability for a current transportation (i.e., associated with an instant/pending transportation request) versus a requestor session (e.g., associated with the instant/pending transportation request and any additional transportation requests submitted within some threshold time after cancelling the instant/pending transportation request). Accordingly, in some embodiments, the cancellation management system can generate one or both of request-specific-conversion probabilities and requestor-session-conversion probabilities.

As also used herein, the term "transportation features" refers to characteristics, attributes, conditions, and/or elements corresponding to a transportation request. A transportation feature may correspond to a transportation request because the feature concerns, for example, a transportation provider, a requestor experience, and/or other aspects related to transportation of a requestor. As described below, a transportation feature can include, for example, an estimated time of arrival at a pickup location or a drop-off location, a predicted amount of detour (e.g., additional/unplanned time or distance for transportation), an amount of time for matching (e.g., pairing) a requestor with a transportation provider, etc.

In addition, as used herein, the term "transportation efficiency metric" refers to a value reflecting an efficiency of modifying a transportation route contingent upon (or accounting for) cancellation of a transportation request. In particular, the transportation efficiency metric can include a value quantifying an efficiency of modifying a projected transportation route for a shared transportation contingent upon (or accounting for) cancellation of a shared-transportation request. For example, a transportation efficiency metric can include an amount of time, a projected monetary value (e.g., monetary cost or profit margin), a transportation provider usage in terms of time or cost, or a computational efficiency (e.g., a measurement of MHz or GHz over time and/or a system bandwidth consumption in megabytes, gigabytes, terabytes, petabytes, etc.).

As further used herein, the term "feedback probability" refers to a likelihood that a requestor submits or otherwise initiates feedback based on (or in response to) a cancellation penalty. In particular, a feedback probability can reflect a likelihood that a requestor initiates feedback (e.g., information regarding dissatisfaction, a remedial request) in the form of a help ticket, a request for assistance from agents, or a text or email—in response to having a cancellation penalty assessed against the requestor.

As further used herein, the term "predicted-requestor rating" refers to an estimated score or rating of a requestor for a user experience corresponding to a transportation request or transportation. In particular, a predicted-requestor rating includes a score or rating estimating how a requestor would likely rate a user experience regarding a transportation request or an on-demand transportation service based on a set of transportation features. For example, the predicted-requestor rating can include a probability that a requestor submits negative feedback based on a quality of the requestor's experience.

Relatedly, the term "routing weight" refers to a value reflecting a predicted-requestor rating. In particular, the routing weight includes a gain factor, an offset value, a cost/profit margin deduction, etc. corresponding to the predicted-requestor rating. For example, the cancellation management system can use a routing weight for selective filtering of potential transportation routes during transportation route selection/matching based on transportation features predicted to affect an experience for a requestor associated with a given transportation route. As another example, the cancellation management system may associate a larger or smaller routing weight (depending on the scale) with a potential transportation route having a predicted set of transportation features that will likely result in a fair user experience compared to a smaller/larger routing weight with a potential transportation route having a predicted set of transportation features that will likely result in a more pleasant/excellent user experience.

As further used herein, the term "transportation route" refers to a path of travel to or from a location, such as from one location to another location. In particular, the transportation route can include a possible path of a vehicle (autonomous, semi-autonomous, or non-autonomous) for navigating from a pick-up location to a drop-off location where one or more requestors can be picked up and/or dropped off by a transportation provider. Examples of transportation routes include a projected transportation route (e.g., an estimated transportation route for transporting one or more requestors), an alternative transportation route (e.g., a transportation route different than or modified from the estimated transportation route), etc.

As further used herein, the term "machine-learning model" refers to a model with one or more processes that can be tuned (e.g., trained) based on inputs to approximate unknown functions. In particular, the term machine-learning model can learn to approximate complex functions and generate outputs based on inputs provided to the model. For instance, the disclosure describes in more detail below, in conjunction with the figures, a conversion-machine-learning model, a requestor-feedback-machine-learning model, and a requestor-experience-rating-machine-learning model. In particular, the cancellation management system can train the conversion-machine-learning model to generate conversion probabilities based on transportation features. The cancellation management system can also train the requestor-feedback-machine-learning model to generate feedback probabilities based on transportation features. Similarly, the cancellation management system can train the requestor-experience-rating-machine-learning model to generate a predicted-requestor rating based on transportation features. These and other machine-learning models can include, for example, linear regression, logistic regression, decision trees, naïve Bayes, k-nearest neighbor, neural networks, long-short term memory, random forests, gradient boosting models, deep learning architectures, classifiers, a combination of the foregoing, etc.

As also used herein, the term "transportation-value metric" refers to a configurable value or measurement of requestor satisfaction, revenue, loyalty, etc. over a period of time for on-demand transportation. For example, in some embodiments, a transportation-value metric refers to (i) a booking metric indicating a quantity of transportation requests projected for receipt from requestors or acceptance by providers in a time period, (ii) a conversion metric indicating a projected quantity or projected rate at which transportation requests result in completed transportation services across geocoded areas in a time period, (iii) a profit metric indicating a projected monetary profit for matching transportation requests to transportation providers across geocoded areas in a time period, or (iv) a revenue metric indicating a projected quantity of revenue for matching transportation requests to transportation providers across geocoded areas in a time period.

Relatedly, the term "geocoded region" (or simply "region") refers to a spatial division or unit of a larger geographic space. For instance, in some embodiments, a region refers to a city, a collection of cities, or a portion of a city. Such regions may include, for example, Chinatown of San Francisco, California; San Francisco, California; or one or more of the Boroughs of New York City, New York. As described below, a region includes a collection of geocoded areas.

The term "geocoded area" refers to a spatial subdivision or subunit of a region or a larger geographic space. A geocoded area may be a subdivision of a geographic neighborhood as well as a subdivision of a city. As a subdivision, a geocoded area may include a segment of a street, a street, a set of bordering streets, a city block, a set of city blocks, or another portion of an area within a larger geographic space. For example, a set of bordering streets may define a geocoded area within a larger space, such as a set of streets around Times Square in New York City, New York. In certain embodiments, a geocoded area represents a geographic hash ("geohash") in a grid (or other polygon shape) of geohashes within a larger geographic space. Regardless of the form of a geocoded area, one or more requestors or providers may be located within a geocoded area.

As suggested above, the term "transportation provider" (or simply "provider") refers to a driver or other person who operates a transportation vehicle and/or who interacts with a provider client device, on the one hand, or an autonomous vehicle, on the other hand. For instance, a transportation provider includes a person who drives a transportation vehicle along various transportation routes—or an autonomous vehicle that drives along such transportation routes—to pick up and drop off requestors.

Turning now to the figures, FIG. 1 illustrates a schematic diagram of an environment 100 for implementing a cancellation management system 105 in accordance with one or more embodiments. As shown in FIG. 1, the environment 100 includes server(s) 102 comprising a dynamic transportation matching system 104 and the cancellation management system 105, transportation vehicles 108a-108n, provider client devices 110a-110n respectively corresponding to the transportation vehicles 108a-108n, requestor client devices 116a-116n respectively corresponding to requestors 120a-120n, and a network 106. In some embodiments, the transportation vehicles 108a-108n optionally include one or both of providers 114a-114n. The providers 114a-114n in this example are human providers associated with both the transportation vehicles 108a-108n and the provider client devices 110a-110n, respectively.

As shown, in one or more embodiments, the cancellation management system 105 can be a component of the dynamic transportation matching system 104 implemented on one or more of the server(s) 102. In these or other embodiments, the cancellation management system 105 may perform one or more acts of the present disclosure described in conjunction with the dynamic transportation matching system 104. Additionally, or alternatively, the dynamic transportation matching system 104 may perform one or more acts of the present disclosure described in conjunction with the cancellation management system 105. Furthermore, although FIG. 1 depicts the cancellation management system 105 and the dynamic transportation matching system 104 as distinct systems, the cancellation management system 105 can be implemented in whole or in part by the dynamic transportation matching system 104, and vice-versa.

As indicated by FIG. 1, the dynamic transportation matching system 104 uses the server(s) 102 to communicate with one or both of the provider client devices 110a-110n and the requestor client devices 116a-116n via the network 106. For example, the dynamic transportation matching system 104 communicates with the provider client devices 110a-110n and the requestor client devices 116a-116n via the network 106 to determine locations of the provider client devices 110a-110n and the requestor client devices 116a-116n, respectively. Per device settings, for instance, the dynamic transportation matching system 104 may receive location coordinates from the provider client devices 110a-110n and/or the requestor client device 116a-116n, respectively. Based on the location coordinates, the dynamic transportation matching system 104 matches or assigns one or more of the transportation vehicles 108a-108n with one or more of the requestors 120a-120n for transportation.

As suggested above, each of the provider client devices 110a-110n and the requestor client devices 116a-116n may comprise a mobile device, such as a laptop, smartphone, or tablet associated with a requestor or a provider. The provider client devices 110a-110n and the requestor client devices 116a-116n may be any type of computing device as further explained below with reference to FIG. 11. In some embodiments, one or more of the provider client devices 110a-110n are not associated with providers, but are attached to (or integrated within) the transportation vehicles 108a-108n, respectively.

As further indicated by FIG. 1, the provider client devices 110a-110n include provider client applications 112a-112n, respectively. Similarly, the requestor client devices 116a-116n include requestor client applications 118a-118n, respectively. In some embodiments, the provider client applications 112a-112n (or the requestor client applications 118a-118n) comprise web browsers, applets, or other software applications (e.g., native applications) respectively available to the provider client devices 110a-110n or the requestor client devices 116a-116n. Additionally, in some instances, the dynamic transportation matching system 104 provides data including instructions that, when executed by the provider client devices 110a-110n or by the requestor client devices 116a-116n, respectively create or otherwise integrate one of the provider client applications 112a-112n or the requestor client applications 118a-118n with an application or webpage.

As indicated by FIG. 1, a requestor may use a requestor client application to request transportation services, receive a price estimate for the transportation service, edit a transportation request, and access other transportation-related services. For example, the requestor 120a may interact with the requestor client device 116a through graphical user interfaces of the requestor client application 118a to cancel a transportation request. In turn, the cancellation management system 105 may provide a custom cancellation notice to the requestor client device 116a via the requestor client application 118a regarding assessment of cancellation penalty for cancelling the transportation request.

As further depicted in FIG. 1, the dynamic transportation matching system 104 sends requests from one or more of the requestor client devices 116a-116n to one or more of the provider client devices 110a-110n within the transportation vehicles 108a-108n, respectively. While FIG. 1 depicts the transportation vehicles 108a-108n as automobiles, a transportation vehicle may also be an airplane, bicycle, motorcycle, scooter, or other vehicle. In some cases, this disclosure describes a transportation vehicle as performing certain functions, but such a transportation vehicle includes an associated provider client device that often performs a corresponding function. For example, when the dynamic transportation matching system 104 sends a transportation request to the transportation vehicle 108a—or queries location information from the transportation vehicle 108a—the dynamic transportation matching system 104 sends the transportation request or location query to the provider client device 110a. Accordingly, the transportation vehicle 108a and the provider client device 110a are part of a vehicle subsystem.

Although not illustrated in FIG. 1, in some embodiments, the environment 100 may have a different arrangement of components and/or may have a different number or set of components altogether. In certain implementations, for instance, some or all of the transportation vehicles 108a-108n do not include a human provider, but constitute autonomous transportation vehicles—that is, a self-driving vehicle that includes computer components and accompanying sensors for driving without manual-provider input from a human operator. As a further example, in some embodiments, one or more of the transportation vehicles 108a-108n include a hybrid self-driving vehicle with both self-driving functionality and some human operator interaction.

When a transportation vehicle is an autonomous vehicle or a hybrid self-driving vehicle, the transportation vehicle may include additional components not depicted in FIG. 1. Such components may include location components, one or more sensors by which the autonomous vehicle navigates, and/or other components necessary to navigate without a provider (or with minimal interactions with a provider). Regardless of whether a transportation vehicle is associated with a provider, a transportation vehicle optionally includes a locator device, such as a GPS device, that determines the location of the transportation vehicle within the transportation vehicles 108a-108n.

As mentioned above, the transportation vehicles 108a-108n respectively include provider client devices 110a-110n separate or integral to the transportation vehicles 108a-108n. Additionally, or alternatively, the provider client device 110a may be a subcomponent of a vehicle computing system. Regardless of its form, the provider client devices 110a-110n may include various sensors, such as a GPS locator, an inertial measurement unit, an accelerometer, a gyroscope, a magnetometer, and/or other sensors, from which the dynamic transportation matching system 104 can access information, such as location information.

In some embodiments, the dynamic transportation matching system 104 communicates with the provider client devices 110a-110n through the provider client applications 112a-112n, respectively. For instance, the provider client application 112a can cause the provider client device 110a to communicate with the dynamic transportation matching system 104 to navigate to a pickup location to pick up a requestor, navigate to a destination location, and/or collect fares. Further, in some cases, the provider client application 112a causes the provider client device 110a to communicate with the dynamic transportation matching system 104 to present a customized cancellation notice described further below.

As shown in FIG. 1, in some embodiments, the cancellation management system 105 can cause the requestor client devices 116a-116n to display customized cancellation notices within user interfaces of the client applications 118a-118n. In particular, the cancellation management system generates conversion probabilities, including (i) a first conversion probability associated with assessing a cancellation penalty for cancelling a transportation request and (ii) a second conversion probability associated with not assessing the cancellation penalty for cancelling the transportation request. Based on the conversion probabilities, the cancellation management system determines whether to assess a cancellation penalty and how to customize a cancellation notice. In FIG. 1, for instance, the cancellation management system 105 determines to customize a cancellation notice for display by the requestor client device 116a to not include a cancellation penalty and a cancellation notice for display by the requestor client device 116n to include a cancellation penalty based on corresponding conversion probabilities.

Figure 2A:
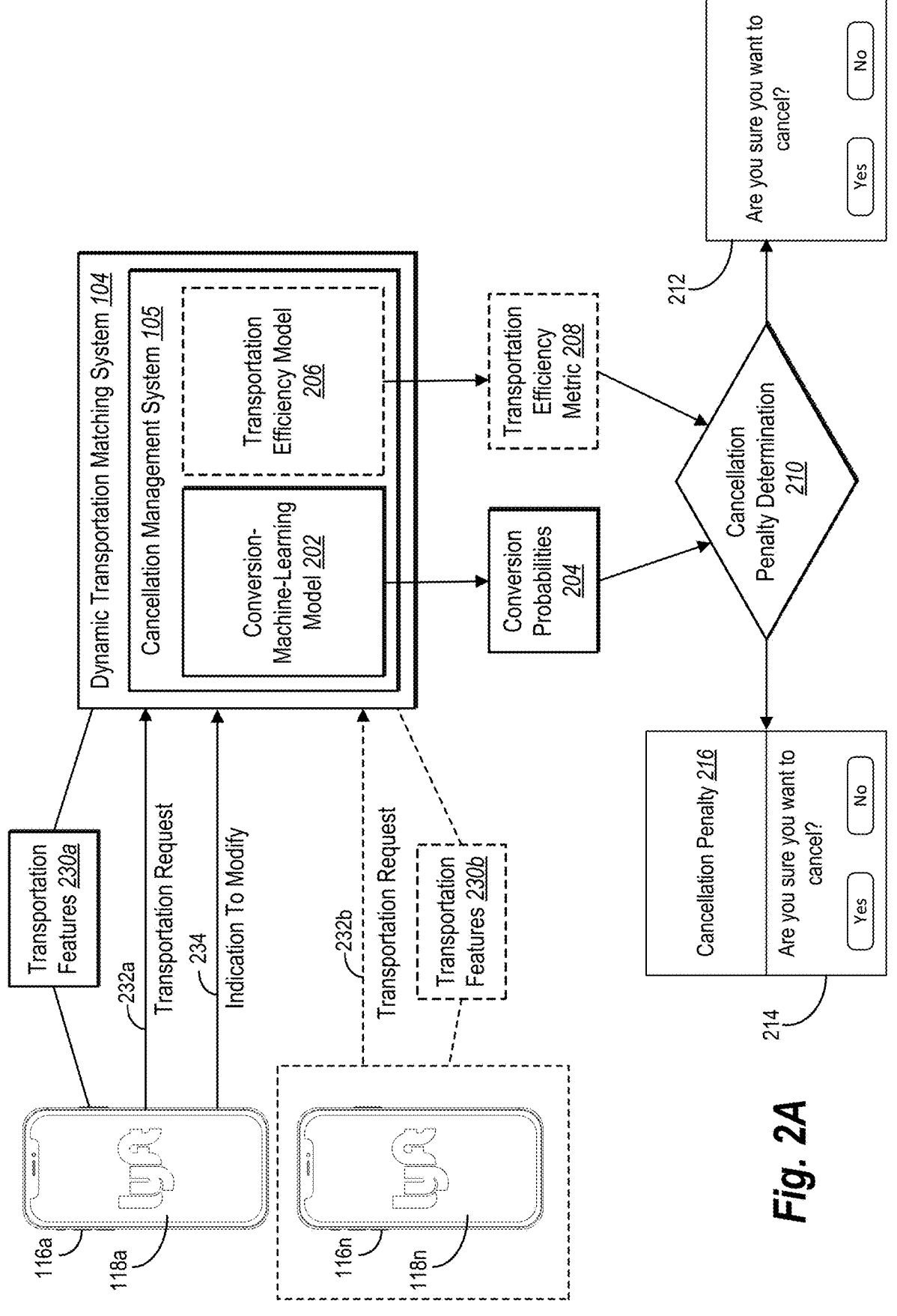
FIGS. 2A-2B illustrate a schematic diagram for determining to assess a cancellation penalty and providing a corresponding customized cancellation notice in accordance with one or more embodiments.
Figure 2B:
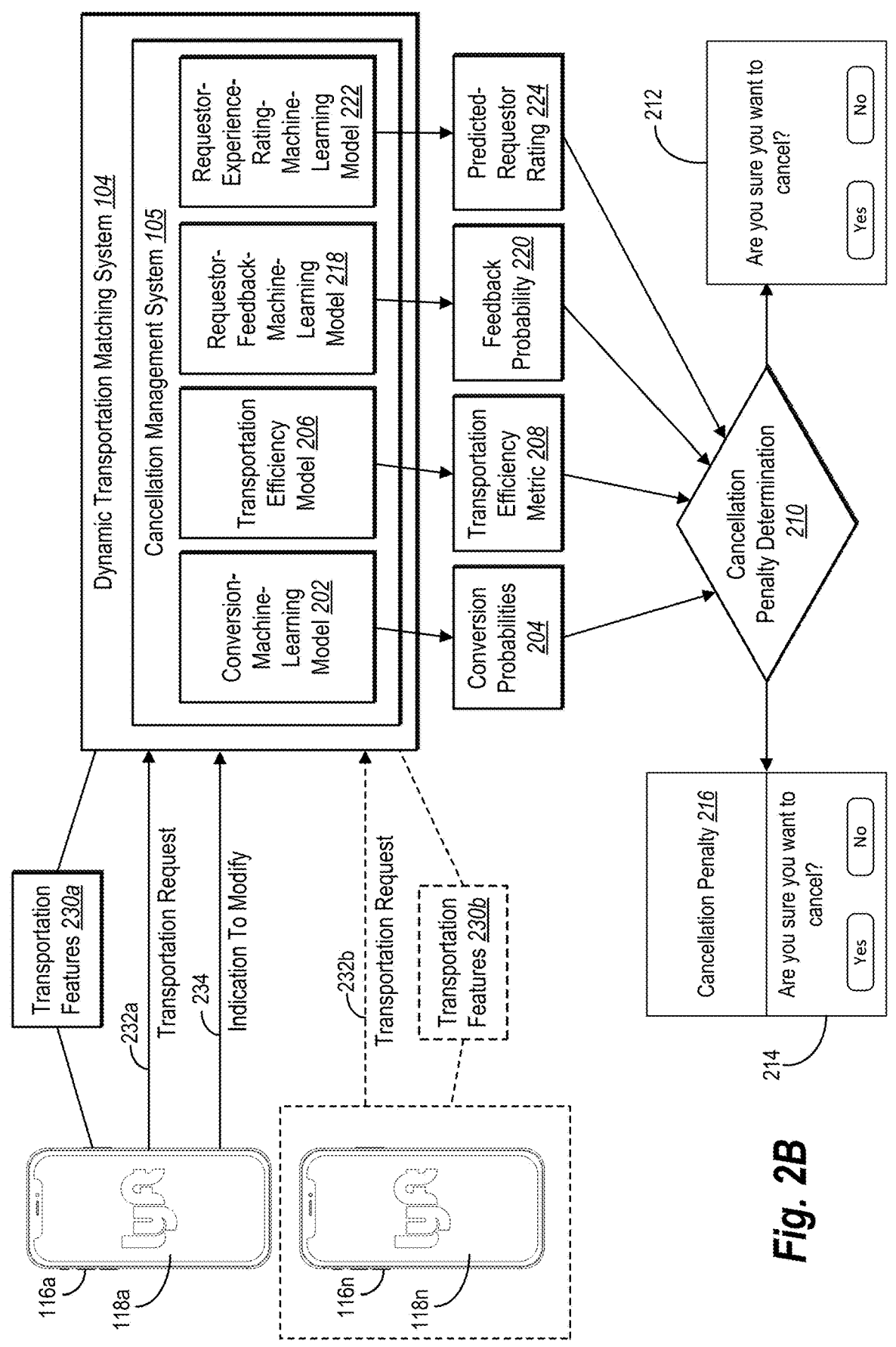

As mentioned above, the cancellation management system 105 can intelligently generate one or both of conversion probabilities and a transportation efficiency metric to dynamically provide a customized cancellation notice in response to cancellation of a transportation request. In accordance with one or more embodiments of the present disclosure, FIGS. 2A-2B illustrate schematic diagram for determining to assess a cancellation penalty and providing a corresponding customized cancellation notice. As shown in FIG. 2A, the cancellation management system 105 includes a conversion-machine-learning model 202 and a transportation efficiency model 206 for generating respective outputs in response to an indication 234 to modify a transportation request 232a. FIG. 2A also illustrates the cancellation management system 105 determining to provide either of a first customized cancellation notice 212 or a second customized cancellation notice 214 to the requestor client device 116a— based on one or both of the generated outputs (e.g., conversion probabilities 204 and a transportation efficiency metric 208). The first customized cancellation notice 212 waives or does not include a cancellation penalty, while the second customized cancellation notice 214 includes a cancellation penalty 216.

Based on executing instructions from the requestor client application 118a, the requestor client device 116a sends the transportation request 232a to the dynamic transportation matching system 104. Based on executing instructions from the requestor client application 118n, the requestor client device 116n optionally sends a transportation request 232b to the dynamic transportation matching system 104. In some embodiments, one or both of the transportation requests 232a and 232b constitute shared-transportation requests, while, in other embodiments, neither of the transportation requests 232a and 232b are shared-transportation requests.

As further illustrated in FIG. 2A, the transportation requests 232a and 232b respectively correspond to transportation features 230a and 232b. As suggested above, one or both of the requestor client device 116a and the cancellation management system 105 determine the transportation features 230a and 230b respectively correspond to the transportation requests 232a and 232b. Based on matching the requestor 120a with the provider 114a in response to the transportation request 232a, for example, the cancellation management system 105 may determine one or more of the following transportation features: (i) a number of communications (e.g., voice calls, video chats, text messages, etc.) exchanged between the provider client device 110a and the requestor client device 116a, (ii) an estimated time of arrival for the provider 114a at a pickup location specified in the transportation request 232a, and/or (iii) an amount of requestor movement since sending the transportation request 232a based on data from the requestor client device 116a (e.g., positional data indicating distance travelled). Additionally, or alternatively, the cancellation management system 105 may determine one or more of the transportation features described below in relation to FIGS. 3A-3B, 4A-4B, and 5A-5B.

As depicted in FIG. 2A, the cancellation management system 105 can generate and/or determine the transportation features 230a and 230b based on the transportation requests 232a and 232b—regardless of receiving the indication 234 to modify the transportation request 232a from the requestor client device 116a or a similar indication to modify the transportation request 232b from the requestor client device 116n. In other embodiments, however, the cancellation management system 105 may opt to generate and/or determine one or more of the transportation features 230a after receiving, for example, the indication 234 to modify the transportation request 232a (e.g., to reduce an amount of computation for the cancellation management system 105 and/or the dynamic transportation matching system 104 when an indication to modify a transportation request is not provided) or a similar indication to modify the transportation request 232b.

In response to the indication 234 to modify the transportation request 232a, in certain implementations, the cancellation management system 105 utilizes the conversion-machine-learning model 202 to generate the conversion probabilities 204 and optionally utilizes the transportation efficiency model 206 to generate the transportation efficiency metric 208. As described further in relation to FIG. 3A, the cancellation management system 105 can train the conversion-machine-learning model 202 to generate conversion probabilities given the transportation features as inputs. After training, in some embodiments, the conversion-machine-learning model 202 generates the conversion probabilities 204 comprising (i) a first conversion probability that a transportation provider transports the requestor 120a to a drop-off location if assessed or shown the cancellation penalty 216 and (ii) a second conversion probability that a transportation provider transports the requestor 120a to a drop-off location if not assessed or shown the cancellation penalty 216. Additionally, or alternatively, in some embodiments, the conversion-machine-learning model 202 generates the conversion probabilities 204 comprising pairs of penalty-amount-specific-conversion probabilities and selects a pair of penalty-amount-specific-conversion probabilities as a basis for determining whether to assess a cancellation penalty in a corresponding cancellation-penalty amount. This disclosure describes such penalty-amount-specific-conversion probabilities in more detail below in relation to FIGS. 3A-3B.

Based on the first conversion probability and the second conversion probability—or a selected first penalty-amount-specific-conversion probability and a selected second penalty-amount-specific-conversion probability—the cancellation management system 105 performs a cancellation penalty determination 210 and provides to the requestor client device 116a either the first customized cancellation notice 212 or the second customized cancellation notice 214. As indicated above, in some embodiments, the cancellation management system 105 performs the cancellation penalty determination 210 in response to the indication 234 to modify a transportation request 232a—in real (or near-real) time.

As further suggested above, the cancellation management system 105 can also generate a transportation efficiency metric as part of determining whether to assess a cancellation penalty for cancellation of a shared-transportation request. As shown in FIG. 2A, the transportation efficiency model 206 optionally generates the transportation efficiency metric 208 given one or more projected values. For example, in some embodiments, the transportation efficiency model 206 generates (i) a first projected value of a transportation provider transporting the requestor 120a and the requestor 120n along a projected transportation route and (ii) a second projected value of transporting the requestor 120n along an alternative projected transportation route. Such an alternative projected transportation route may comprise, for example, transporting the requestor 120n alone and without the requestor 120a, or transporting the requestor 120n with an additional requestor associated with an additional shared-transportation request.

Based on the projected values, the cancellation management system 105 can generate the transportation efficiency metric 208. As shown in FIG. 2A, the cancellation management system 105 can then perform the cancellation penalty determination 210 based additionally or alternatively on the transportation efficiency metric 208 and provide to the requestor client device 116a either the first customized cancellation notice 212 or the second customized cancellation notice 214.

In accordance with one or more embodiments, FIG. 2B depicts the cancellation management system 105 further including a requestor-feedback-machine-learning model 218 and a requestor-experience-rating-machine-learning model 222 for generating respective outputs. In particular, FIG. 2B illustrates the cancellation management system 105 determining to provide either of the first customized cancellation notice 212 or the second customized cancellation notice 214 to the requestor client device 116a—depending on one or more of the generated outputs. For example, in FIG. 2B, the cancellation management system 105 performs the cancellation penalty determination 210 based on one or more of the conversion probabilities 204, the transportation efficiency metric 208, a feedback probability 220, or a predicted-requestor rating 224.

As indicated by FIG. 2B, the cancellation management system 105 may utilize the requestor-feedback-machine-learning model 218 to generate or predict the feedback probability 220 in response to the indication 234 to modify the transportation request 232a. In some cases, the requestor-feedback-machine-learning model 218 generates a penalty-amount-specific-feedback probability as the feedback probability 220. As described in relation to FIG. 4A below, the cancellation management system 105 trains the requestor-feedback-machine-learning model 218 to generate feedback probabilities given transportation features as inputs. Based on the transportation features 230a, in some embodiments, the requestor-feedback-machine-learning model 218 generates the feedback probability 220 reflecting a probability that the requestor 120a submits feedback in response to a cancellation penalty. The cancellation management system 105 then performs the cancellation penalty determination 210 additionally or alternatively based on the feedback probability 220 and provides to the requestor client device 116a either the first customized cancellation notice 212 or the second customized cancellation notice 214.

As further shown in FIG. 2B, the cancellation management system 105 may utilize the requestor-experience-rating-machine-learning model 222 to generate the predicted-requestor rating 224. The requestor-experiencerating-machine-learning model 222 can generate the predicted-requestor rating 224 in response to the indication 234 to modify the transportation request 232a or during a matching period for assigning one or more requestors to a transportation provider (e.g., before receiving the indication 234 to modify the transportation request 232a). As further described in relation to FIG. 5A, the cancellation management system 105 trains the requestor-experience-rating-machine-learning model 222 to generate predicted-requestor ratings given transportation features (or predicted transportation features) as inputs. After training, in some embodiments, the requestor-experience-rating-machine-learning model 222 generates the predicted-requestor rating 224 of an experience for the requestor 120a (e.g., a transportation experience or a transportation-request experience) based on the transportation features 230a corresponding to the transportation request 232a. The cancellation management system 105 then performs the cancellation penalty determination 210 additionally or alternatively based on the predicted-requestor rating 224 and provides to the requestor client device 116a either the first customized cancellation notice 212 or the second customized cancellation notice 214.

Figures 3A, 3B:
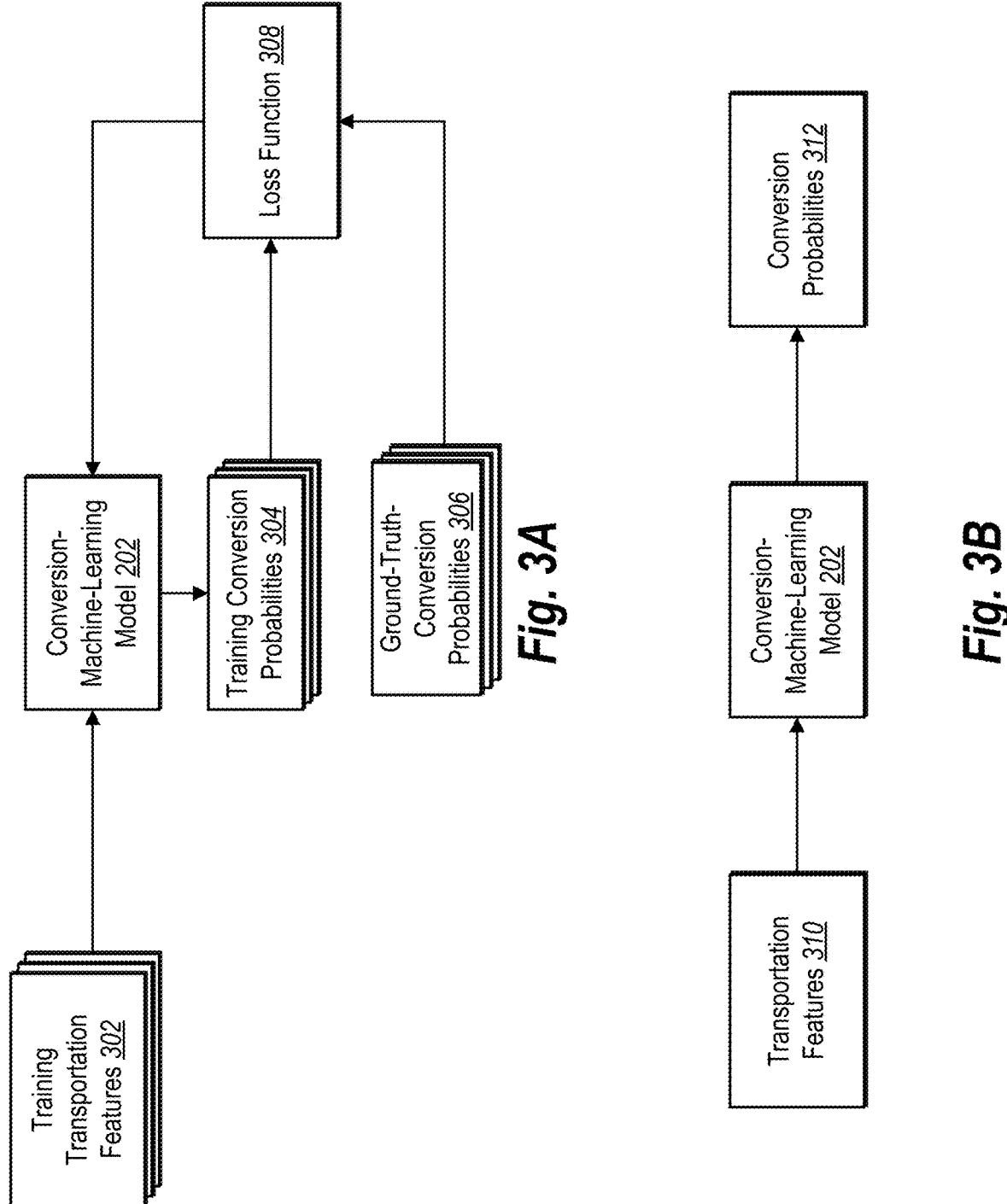
FIG. 3A illustrates training a conversion-machine-learning model in accordance with one or more embodiments.
FIG. 3B illustrates a trained conversion-machine-learning model generating a conversion probability in accordance with one or more embodiments.

As mentioned above, the cancellation management system 105 can utilize the conversion-machine-learning model 202 to generate one or more conversion probabilities for dynamically providing a customized cancellation notice to a requestor client device. In accordance with one or more embodiments, FIG. 3A illustrates the cancellation management system 105 training the conversion-machine-learning model 202 to generate one or more conversion probabilities. In accordance with one or more embodiments, FIG. 3B illustrates the cancellation management system 105 applying the conversion-machine-learning model 202 to generate conversion probabilities.

As shown in FIG. 3A, the cancellation management system 105 provides training transportation features 302 to the conversion-machine-learning model 202. The conversion-machine-learning model can include a support vector machine, a convolutional neural network, a decision tree, among other types of machine-learning models described above. Accordingly, the cancellation management system 105 can modify the training process shown in FIG. 3A depending on the type of machine-learning model(s) that the conversion-machine-learning model 202 comprises.

In each training iteration, training transportation features correspond to a transportation request. The training transportation features 302 can include, for example, (i) an estimated time of arrival (ETA) of a transportation provider at a pickup location of the requestor, (ii) an amount of time between the transportation provider accepting the transportation request and the requestor cancelling the transportation request, and/or (iii) a distance between the requestor device and the pickup location. Additional, or alternative, examples of transportation features can include, but are not limited to: (iv) displaying or not displaying a cancellation penalty to a requestor, (v) an actual arrival time deviation from the ETA, (vi) a number of communications (e.g., voice calls, texts, etc.) between the requestor and the transportation provider, (vii) an average velocity of a transportation provider by geocoded area, (vii) a change in transportation provider ETA since acceptance of the transportation request, (ix) a number of additional transportations/requestors assigned to the transportation route since acceptance of the transportation request, (x) an operating system, (xi) a number of transportations or requestors assigned to the transportation route prior to acceptance of the transportation request, (xii) local time or day of the week or month, (xiii) average velocity of the transportation provider, (xiv) an amount of requestor movement since submission of the transportation request, (xiv) an amount of time between submission of the transportation request and acceptance of the transportation request, (xvi) elapsed time since acceptance of the transportation request, (xvii) ride or transportation type (e.g., shared, classic, wheel-chair accessible, etc.), (xviii) a shift in time or day of the week for traffic congestion in a geocoded area, (xix) a number of finished/converted transportations, (xx) a re-submission rate of transportation requests for the requestor (e.g., a historical re-submission rate), (xxi) a number of cancelled transportation requests for the requestor, (xxii) a requestor distance from pickup location at time of request, (xxiii) a requestor distance from the pickup location at the time of providing an indication to modify the transportation request, (xxiv) an average ETA post-matching of transportation provider with a requestor by geocoded area, and (xxv) a cancellation-penalty amount. In these or other embodiments, the training transportation features 302 relating to distance may be Haversine distances, and may be in any suitable unit of distance (e.g., meters). Further, the training transportation features 302 relating to time may be in any suitable unit of time (e.g., seconds).

In some embodiments, the cancellation management system 105 trains the conversion-machine-learning model 202 to generate training conversion probabilities reflecting probabilities that a transportation provider transports a requestor to a drop-off location based on one or both of an initial transportation request and a subsequent transportation request. In these or other embodiments, a portion of the training transportation features 302 may be relevant to generating training conversion probabilities based on an initial transportation request, while another portion of the training transportation features 302 may be relevant to generating training conversion probabilities based on a subsequent transportation request sent within a threshold period of time. Some of the training transportation features 302 may be relevant to both an initial transportation request and a subsequent transportation request, while others of the training transportation features 302 may be relevant to only one of an initial transportation request and a subsequent transportation request.

Based on one or more of the training transportation features 302, the conversion-machine-learning model 202 generates training conversion probabilities 304 in an initial training iteration. As part of the initial training iteration, the cancellation management system 105 compares ground-truth-conversion probabilities 306 to the training conversion probabilities 304 to determine a loss. In some embodiments, the ground-truth-conversion probabilities 306 include (i) a first conversion probability associated with assessing a cancellation penalty for cancelling the transportation request and (ii) a second conversion probability associated with not assessing the cancellation penalty for cancelling the transportation request. As shown in FIG. 3A, the ground-truth-conversion probabilities 306 correspond to the training transportation features 302 and are based on observed conversion data for cancelled/converted transportations that include various transportation features. For example, the cancellation management system 105 can compare the training conversion probabilities 304 with the ground-truth-conversion probabilities 306 to determine a loss using a loss function 308.

Additionally, or alternatively, in some embodiments, the cancellation management system 105 trains the conversion-machine-learning model 202 based on specific variants of the training transportation features 302. Accordingly, the conversion-machine-learning model 202 can learn how various degrees of a given training transportation feature affects conversion. To reflect such varying degrees in training iterations, in some embodiments, the conversion-machine-learning model 202 utilizes ground-truth-conversion probabilities corresponding to training transportation features reflecting degrees, levels, or amounts of a given training transportation feature.

For example, in some implementations, the cancellation management system 105 inputs a particular cancellation-penalty amount as a training transportation feature to generating training conversion probabilities. By comparing training conversion probabilities based on a particular cancellation-penalty amount to ground-truth-conversion probabilities corresponding to the particular cancellation-penalty amount, the cancellation management system 105 trains the conversion-machine-learning model 202 to accurately predict conversion probabilities specific to the cancellation-penalty amount.

For instance, in some embodiments, the cancellation management system 105 uses the conversion-machine-learning model 202 to generate a set of training conversion probabilities based on a $0.00 cancellation-penalty amount and compares such probabilities with ground-truth-conversion probabilities to determine a loss. Similarly, in certain implementations, the cancellation management system 105 uses the conversion-machine-learning model 202 to generate a set of training conversion probabilities based on a $2.00, $3.50, or $5.00 cancellation-penalty amount and compares such probabilities with ground-truth-conversion probabilities to determine a loss, and so forth. In these or other embodiments, the cancellation management system 105 trains the conversion-machine-learning model 202 based on multiple variants of training transportation features (e.g., varying cancellation-penalty amounts and varying ETA amounts) to determine interactions therebetween relating to conversion probabilities.

As shown in FIG. 3A, the loss function 308 can include, but is not limited to, a regression loss function (e.g., a mean square error function, a quadratic loss function, an L2 loss function, a mean absolute error/L1 loss function, mean bias error). Additionally, or alternatively, the loss function 308 can include a classification loss function (e.g., a hinge loss/multi-class SVM loss function, cross entropy loss/negative log likelihood function).

Further, the loss function 308 can return quantifiable data regarding the difference between the training conversion probabilities 304 and the ground-truth-conversion probabilities 306. In particular, the loss function 308 can return such loss data to the conversion-machine-learning model 202 based upon which the cancellation management system 105 adjusts various parameters/hyperparameters to improve the quality/accuracy of training conversion probabilities in subsequent training iterations—by narrowing the difference between training conversion probabilities and ground-truth-conversion probabilities.

In some embodiments, the loss function 308 can include an Adam optimizer for intelligently adjusting weights and various parameters/hyperparameters within the conversion-machine-learning model 202. Moreover, the training of the conversion-machine-learning model 202 can be an iterative process (as shown by the return arrow between the loss function 308 and the conversion-machine-learning model 202) such that the cancellation management system 105 continually adjusts parameters/hyperparameters of the conversion-machine-learning model 202 over training iterations.

After modifying parameters of the conversion-machine-learning model 202 for an initial training iteration, in certain implementations, the cancellation management system 105 performs additional training iterations. In a subsequent training iteration, for instance, the cancellation management system 105 generates subsequent training conversion probabilities based on a different set of training transportation features. The cancellation management system 105 further compares the subsequent training conversion probabilities to subsequent ground-truth-conversion probabilities using the loss function 308 and modifies parameters of the conversion-machine-learning model 202 based on a determined loss.

By iteratively determining losses from a comparison of training conversion probabilities and ground-truth-conversion probabilities, the cancellation management system 105 trains the conversion-machine-learning model 202 to generate conversion probabilities. In some cases, the cancellation management system 105 performs training iterations until the parameters (e.g., values or weights) of the conversion-machine-learning model 202 do not change significantly across training iterations or otherwise satisfy a convergence criteria.

After training the conversion-machine-learning model 202, the cancellation management system 105 applies a trained version of the conversion-machine-learning model 202. In accordance with one or more embodiments, FIG. 3B illustrates the cancellation management system 105 applying the conversion-machine-learning model 202 to generate conversion probabilities 312 based on transportation features 310. As indicated above, the transportation features 310 correspond to a transportation request—either for a single transportation request or a shared-transportation request. Similarly, the transportation features 310 may include any of the example features described above from the training transportation features 302.

As indicated above, in some embodiments, the conversion-machine-learning model 202 generates the conversion probabilities 312 as requestor-session-conversion probabilities. For example, in certain implementations, the conversion-machine-learning model 202 generates the conversion probabilities 312 comprising (i) a first request-session-conversion probability that a transportation provider transports a requestor to a drop-off location in response to a transportation request within a threshold time period if assessed or shown a cancellation penalty and (ii) a second request-session-conversion probability that a transportation provider transports a requestor to a drop-off location in response to a transportation request within a threshold time period if not assessed or shown the cancellation penalty. Such a transportation request may be an initial transportation request or a subsequent transportation request within a threshold time period from sending or cancelling the initial transportation request.

As indicated above, in certain implementations, the conversion-machine-learning model 202 generates the conversion probabilities 312 corresponding to specific cancellation-penalty amounts. For instance, in some cases, the conversion-machine-learning model 202 generates the following request-session-conversion probabilities that a transportation provider transports a requestor to a drop-off location in response to a transportation request within a threshold time period: (i) a first request-session-conversion probability associated with assessing or showing a cancellation penalty of $1.00 for a cancellation, (ii) a second request-session-conversion probability associated with not assessing or not showing the cancellation penalty of $1.00 for a cancellation, (iii) a first request-session-conversion probability associated with assessing or showing a cancellation penalty of $2.00 for a cancellation, (iv) a second request-session-conversion probability associated with not assessing or not showing the cancellation penalty of $2.00 for a cancellation, and so forth. In some implementations, the conversion-machine-learning model 202 generates a pair of conversion probabilities for cancellation-penalty amounts within a range, such as pairs of conversion probabilities for cancellation-penalty amounts, for example, in $0.50 or $1.00 increments ranging from $0.00 to $5.00.

Consistent with the disclosure above, the cancellation management system 105 determines a delta between each pair of conversion probabilities and selects one such conversion-probability delta as a basis for determining whether to assess a cancellation penalty. To illustrate, the cancellation management system 105 determines a conversion-probability delta between first and second conversion probabilities for a $0.00 cancellation-penalty amount, a conversion-probability delta between first and second conversion probabilities for a $0.50 cancellation-penalty amount, and so forth for conversion-probability delta corresponding to increments through $5.00. The cancellation management system 105 subsequently selects one such conversion-probability delta as a basis for determining whether to assess a cancellation penalty in a corresponding cancellation-penalty amount. In some cases, the cancellation management system 105 selects a conversion-probability delta corresponding to a largest difference in probabilities or the conversion-probability delta indicating a highest probability of conversion.

In addition (or in the alternative) to determining conversion probabilities corresponding to incremental cancellation-penalty amounts, the cancellation management system 105 can determine conversion probabilities corresponding to a continuous range of cancellation-penalty amounts. For instance, in some cases, the cancellation management system 105 (i) uses the conversion-machine-learning model 202 to generate pairs of conversion probabilities corresponding to cancellation-penalty amounts within a range by increment (e.g., conversion probabilities for cancellation-penalty amounts between $0.00 and $5.00 in $0.50 increments) and (ii) determines a curve that fits the pairs of conversion probabilities at each increment or corresponding conversion-probability deltas. Additionally or alternatively, the cancellation management system 105 can generate at least two pairs of conversion probabilities corresponding to discrete cancellation-penalty amounts and, via interpolation, determine one or more additional pairs of conversion probabilities between the discrete cancellation-penalty amounts (e.g., to generate a continuous range of cancellation-penalty amounts corresponding to respective conversion probability pairs).

Based on the fitted curve or interpolated conversion probability values, the cancellation management system 105 can predict pairs of conversion probabilities for a continuous range of cancellation-penalty amounts. By analyzing the fitted curve of conversion-probability deltas, for example, the cancellation management system 105 can select a conversion-probability delta as a basis for determining whether to assess a cancellation penalty in a corresponding cancellation-penalty amount (e.g., by selecting a conversion-probability delta corresponding to a largest difference in probabilities indicated by the curve or the conversion-probability delta indicating a highest probability of conversion indicated by the curve).

In some embodiments, the cancellation management system 105 utilizes a total probability theorem to determine the conversion probabilities 312 as requestor-session-conversion probabilities. For example, the cancellation management system 105 adds (a) the conversion probabilities based on an initial transportation request, to the scalar product of (b) the conversion probabilities based on a subsequent transportation request within a threshold time period, and (c) the difference of one minus the conversion probabilities based on an initial transportation request. Then, utilizing the conversion probabilities 312 as requestor-session-conversion probabilities, the cancellation management system 105 can determine the delta between a first requestor-session-conversion probability reflecting if a cancellation penalty is assessed or presented to the requestor and a second requestor-session-conversion probability reflecting if a cancellation penalty is not assessed or presented to the requestor.

In some embodiments, the cancellation management system 105 further applies the foregoing delta of requestor-session-conversion probabilities to a value metric (e.g., the transportation-value metric such as a bookings metric, an upfront fare amount for the transportation, a matching efficiency, a provider payout amount) to determine a conversion-benefit metric. Additionally, in some embodiments as indicated above, the cancellation management system 105 selects a conversion-probability delta corresponding to a particular cancellation penalty amount for applying to the value metric to generate the conversion-benefit metric. In some embodiments, the conversion-benefit metric represents bookings, conversion, profit, and/or some another suitable metric. The cancellation management system 105 uses the conversion-benefit metric to determine whether to present the cancellation penalty to the requestor for cancelling a transportation request.

For instance, if the conversion-benefit metric plus an amount of collected cancellation fees (from the assessed cancellation penalty) minus an adjusted transportation-value metric and minus provider payout fees for cancellation of the transportation request amounts to a negative net gain value, then the cancellation management system 105 determines to waive a cancellation penalty for a requestor cancelling a transportation request. Otherwise, if the net gain is a positive value, then the cancellation management system 105 determines to assess the cancellation penalty for a requestor cancelling a transportation request.

Figures 4A, 4B:
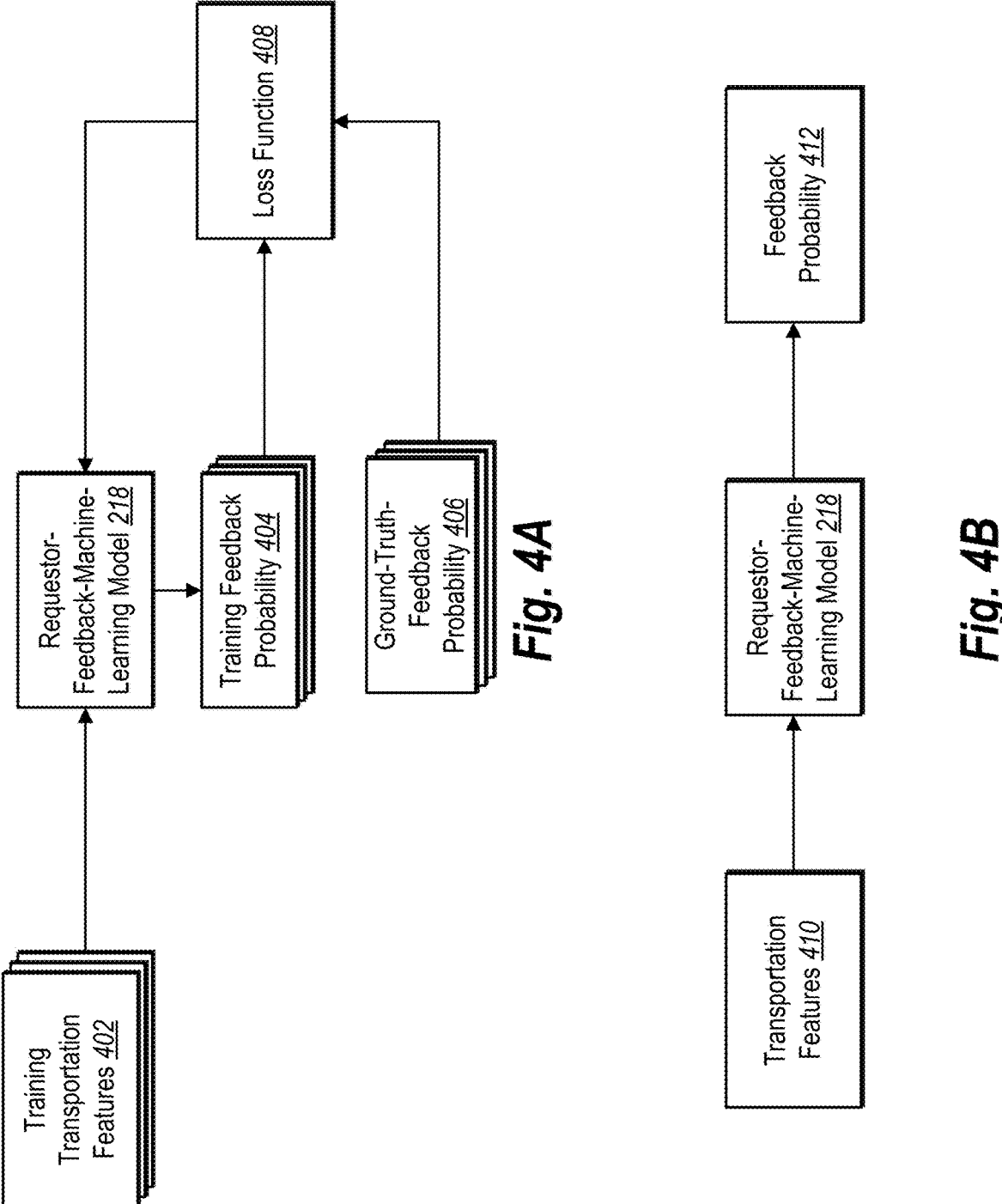
FIG. 4A illustrates training a requestor-feedback-machine-learning model in accordance with one or more embodiments.
FIG. 4B illustrates a trained requestor-feedback-machine-learning model generating a feedback probability in accordance with one or more embodiments.

As mentioned above, the cancellation management system 105 can utilize the requestor-feedback-machine-learning model 218 to generate a feedback probability for dynamically providing a customized cancellation notice to a requestor client device. In accordance with one or more embodiments, FIG. 4A illustrates the cancellation management system 105 training the requestor-feedback-machine-learning model 218 to generate a feedback probability. In accordance with one or more embodiments, FIG. 4B illustrates the cancellation management system applying the requestor-feedback-machine-learning model 218 to generate a feedback probability.

As shown in FIG. 4A, the cancellation management system 105 provides training transportation features 402 to the requestor-feedback-machine-learning model 218. The requestor-feedback-machine-learning model 218 can include a support vector machine, a convolutional neural network, a decision tree, among other types of machine-learning models described above. Accordingly, the cancellation management system 105 can modify the training process shown in FIG. 4A depending on the type of machine-learning model(s) that the requestor-feedback-machine-learning model 218 comprises.

In each training iteration, training transportation features correspond to a transportation request. The training transportation features 402 can include, for example, (i) an average velocity associated with a transportation provider, (ii) a total number of transportations or a total number of transportation requests in a geocoded area, and/or (iii) a number of communications (e.g., voice calls, texts, etc.) between the requestor and the transportation provider. Additional or alternative examples of transportation features can include, but are not limited to: (iv) one or more of the training transportation features 302 mentioned above, (v) a timeliness of a transportation provider to arrive at a pickup location or a drop-off location, (vi) a transportation provider rating, (vi) a cancellation rate for a transportation provider, or (viii) a number of cancelled transportation requests for the requestor, among various other transportation features. In these or other embodiments, the training transportation features 402 relating to distance may be Haversine distances, and may be in any suitable unit of distance (e.g., meters). Further, the training transportation features 402 relating to time may be in any suitable unit of time (e.g., seconds).

Based on one or more of the foregoing training transportation features 402, the requestor-feedback-machine-learning model 218 generates a training feedback probability 404 in an initial training iteration. As part of the initial training iteration, the cancellation management system 105 compares ground-truth-feedback probability 406 to the training feedback probability 404 to determine a loss. In some embodiments, the ground-truth-feedback probability 406 includes a feedback probability associated with a requestor submitting or otherwise initiating feedback in response to a cancellation penalty for cancelling a transportation request. As shown in FIG. 4A, the ground-truth-feedback probability 406 corresponds to the training transportation features 402 and are based on feedback data for cancelled transportations that include various transportation features. For example, the cancellation management system 105 can compare the training feedback probability 404 with the ground-truth-feedback probability 406 to determine a loss using a loss function 408.

Additionally, or alternatively, in some embodiments, the cancellation management system 105 trains the requestor-feedback-machine-learning model 218 based on specific variants of the training transportation features 402. Accordingly, the requestor-feedback-machine-learning model 218 can learn how various degrees of a given training transportation feature affects feedback probability. To reflect such varying degrees in training iterations, in some embodiments, the requestor-feedback-machine-learning model 218 utilizes ground-truth-feedback probabilities corresponding to training transportation features reflecting degrees, levels, or amounts of a given training transportation feature.

For example, in some implementations, the cancellation management system 105 inputs a particular cancellation-penalty amount as a training transportation feature for generating a training feedback probability. By comparing a training feedback probability based on a particular cancellation-penalty amount to a ground-truth-feedback probability corresponding to the particular cancellation-penalty amount, the cancellation management system 105 trains the requestor-feedback-machine-learning model 218 to accurately predict feedback probabilities specific to the cancellation-penalty amount.

For instance, in some embodiments, the cancellation management system 105 uses the requestor-feedback-machine-learning model 218 to generate a training feedback probability based on a $0.00 cancellation-penalty amount and compares such a probability with a ground-truth-feedback probability to determine a loss. Similarly, in certain implementations, the cancellation management system 105 uses the requestor-feedback-machine-learning model 218 to generate training feedback probabilities based on a $2.00, $3.50, or $5.00 cancellation-penalty amount and compares such probabilities with respective ground-truth-feedback probabilities to determine a loss, and so forth. In these or other embodiments, the cancellation management system 105 trains the requestor-feedback-machine-learning model 218 based on multiple variants of training transportation features (e.g., varying cancellation-penalty amounts and varying ETA amounts) to determine interactions therebetween relating to feedback probabilities.

As shown in FIG. 4A, the loss function 408 can include, but is not limited to, a regression loss function (e.g., a mean square error function, a quadratic loss function, an L2 loss function, a mean absolute error/L1 loss function, mean bias error). Additionally, or alternatively, the loss function 408 can include a classification loss function (e.g., a hinge loss/multi-class SVM loss function, cross entropy loss/negative log likelihood function).

Further, the loss function 408 can return quantifiable data regarding the difference between the training feedback probability 404 and the ground-truth-feedback probability 406. In particular, the loss function 408 can return such loss data to the requestor-feedback-machine-learning model 218 based upon which the cancellation management system 105 adjusts various parameters/hyperparameters to improve the quality/accuracy of training feedback probabilities in subsequent training iterations—by narrowing the difference between training feedback probability and ground-truth-feedback probability.

In some embodiments, the loss function 408 can include an Adam optimizer for intelligently adjusting weights and various parameters/hyperparameters within the requestor-feedback-machine-learning model 218. Moreover, the training of the requestor-feedback-machine-learning model 218 can be an iterative process (as shown by the return arrow between the loss function 408 and the requestor-feedback-machine-learning model 218) such that the cancellation management system 105 continually adjusts parameters/hyperparameters of the requestor-feedback-machine-learning model 218 over training iterations.

After modifying parameters of the requestor-feedback-machine-learning model 218 for an initial training iteration, in certain implementations, the cancellation management system 105 performs additional training iterations. In a subsequent training iteration, for instance, the cancellation management system 105 generates subsequent training feedback probabilities based on a different set of training transportation features. The cancellation management system 105 further compares the subsequent training feedback probabilities to subsequent ground-truth-feedback probabilities using the loss function 408 and modifies parameters of the requestor-feedback-machine-learning model 218 based on a determined loss.

By iteratively determining losses from a comparison of training feedback probabilities and ground-truth-feedback probabilities, the cancellation management system 105 trains the requestor-feedback-machine-learning model 218 to generate feedback probabilities. In some cases, the cancellation management system 105 performs training iterations until the parameters (e.g., values or weights) of the requestor-feedback-machine-learning model 218 do not change significantly across training iterations or otherwise satisfy a convergence criteria.

After training the requestor-feedback-machine-learning model 218, the cancellation management system 105 applies a trained version of the requestor-feedback-machine-learning model 218. In accordance with one or more embodiments, FIG. 4B illustrates the cancellation management system 105 applying the trained requestor-feedback-machine-learning model 218 to generate a feedback probability 412 based on transportation features 410. As indicated above, the transportation features 410 correspond to a transportation request-either for a single transportation request or a shared-transportation request. Similarly, the transportation features 410 may include any of the example features described above from the training transportation features 402.

As mentioned above, in some embodiments, the requestor-feedback-machine-learning model 218 generates the feedback probability 412. For example, in certain implementations, the requestor-feedback-machine-learning model 218 generates the feedback probability 412 comprising a probability that a requestor will submit or otherwise initiate feedback in response to the cancellation management system 105 assessing a cancellation penalty for cancelling a transportation request.

As indicated above, in certain implementations, the requestor-feedback-machine-learning model 218 generates the feedback probabilities 412 corresponding to specific cancellation-penalty amounts. For instance, in some cases, the requestor-feedback-machine-learning model 218 generates the following feedback probabilities that a requestor initiates feedback in response to a cancellation penalty: (i) a first feedback probability associated with assessing or showing a cancellation penalty of $1.00 for a cancellation, (ii) a second feedback probability associated with assessing or showing a cancellation penalty of $2.00 for a cancellation, (iii) a third feedback probability associated with assessing or showing a cancellation penalty of $3.00 for a cancellation, and so forth. In some implementations, the requestor-feedback-machine-learning model 218 generates feedback probabilities for cancellation-penalty amounts within a range, for example, in $0.50 or $1.00 increments ranging from $0.00 to $5.00.

Consistent with the disclosure above, the cancellation management system 105 subsequently selects a penalty-amount-specific-feedback probability as a basis for determining whether to assess a cancellation penalty in a corresponding cancellation-penalty amount. In some cases, for instance, the cancellation management system 105 selects a penalty-amount-specific-feedback probability corresponding to the cancellation-penalty amount for selected conversion probabilities (e.g., such that a conversion-probability delta and a feedback probability correspond to a same cancellation-penalty amount). Alternatively, in some embodiments, the cancellation management system 105 selects a penalty-amount-specific-feedback probability corresponding to a lowest probability that a requestor initiates feedback in response to a cancellation penalty. In some such cases, the cancellation management system 105 similarly selects a conversion-probability delta corresponding to a same cancellation-penalty amount.

In addition (or in the alternative) to determining feedback probabilities corresponding to incremental cancellation-penalty amounts, the cancellation management system 105 can determine feedback probabilities corresponding to a continuous range of cancellation-penalty amounts. For instance, in some cases, the cancellation management system 105 (*i*)

uses the requestor-feedback-machine-learning model 218 to generate feedback probabilities corresponding to cancellation-penalty amounts within a range by increment (e.g., feedback probabilities for cancellation-penalty amounts between $0.00 and $5.00 in $0.50 increments) and (ii) determines a curve that fits the feedback probabilities at each increment. Additionally, or alternatively, the cancellation management system 105 can generate feedback probabilities corresponding to discrete cancellation-penalty amounts and, via interpolation, determine one or more additional feedback probabilities between the discrete cancellation-penalty amounts (e.g., to generate a continuous range of cancellation-penalty amounts corresponding to respective feedback probabilities).

Based on the fitted curve or interpolated feedback probability values, the cancellation management system 105 can predict feedback probabilities for a continuous range of cancellation-penalty amounts. By analyzing the fitted curve or identifying feedback probabilities within a range, the cancellation management system 105 selects a feedback probability as a basis for determining whether to assess a cancellation penalty at a corresponding cancellation-penalty amount-consistent with the disclosure above.

In some embodiments, the cancellation management system 105 further applies the feedback probability 412 to a value metric (e.g., the transportation-value metric such as a bookings metric, a requestor loyalty metric, a long-term value associated with the requestor, an upfront fare amount for the transportation, a matching efficiency, a provider payout amount) to generate the adjusted transportation-value metric mentioned above. Additionally, in some embodiments as indicated above, the cancellation management system 105 selects a feedback probability corresponding to a particular cancellation penalty amount and applies such a penalty-amount-specific-feedback probability to the value metric to generate the adjusted transportation-value metric. In turn, the cancellation management system 105 uses the adjusted transportation-value metric to determine whether to present the cancellation penalty to the requestor for cancelling a transportation request.

For instance, the cancellation management system 105 may apply a constant term as the transportation-value metric, while in other embodiments, the cancellation management system 105 may apply a requestor-specific term as the transportation-value metric. For example, the cancellation management system 105 may associate a repeat-requestor that is part of a paid subscription plan for transportation services with a higher transportation-value metric than a first-time requestor with no converted transportation requests. As additional examples, the cancellation management system can determine the transportation-value metric based on a number of transportations per week/month for a requestor or a requestor rating for a requestor from providers' perspectives, among other suitable factors.

In turn, the cancellation management system 105 can apply the adjusted transportation-value metric to the net gain computation described above in relation to FIG. 3B to determine whether to assess a cancellation penalty. In this manner, the cancellation management system 105 can balance the benefit of conversion with a likelihood of future bookings, future conversions, future profits, or other suitable metric.

Figures 5A, 5B:
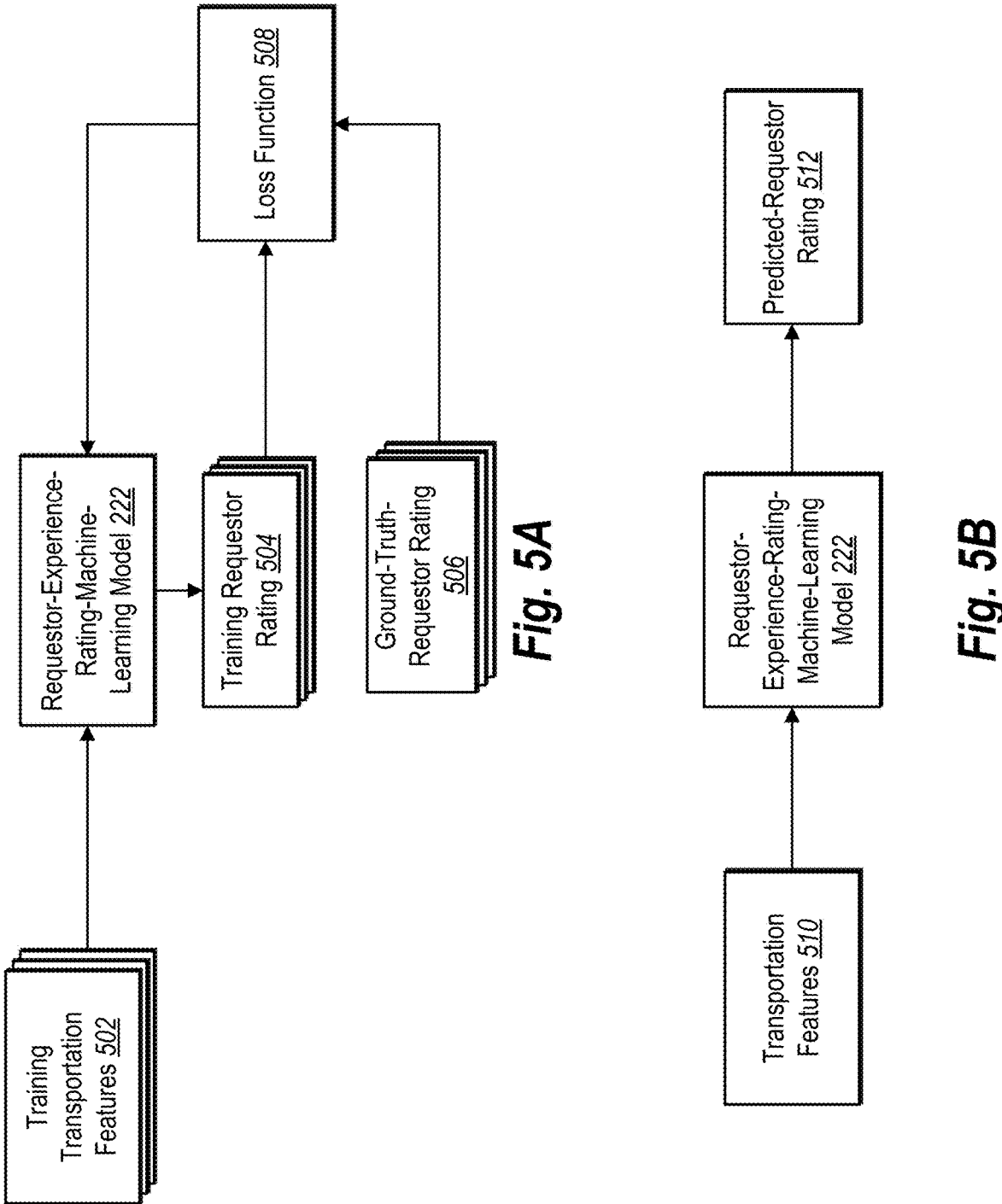
FIG. 5A illustrates training a requestor-experience-rating-machine-learning model in accordance with one or more embodiments.
FIG. 5B illustrates a trained requestor-experience-rating-machine-learning model generating a predicted-requestor rating in accordance with one or more embodiments.

As mentioned above, the cancellation management system 105 can utilize the requestor-experience-rating-machine-learning model 222 to generate a predicted-requestor rating for dynamically providing a customized cancellation notice to a requestor client device. In accordance with one or more embodiments, FIG. 5A illustrates the cancellation management system 105 training the requestor-experience-rating-machine-learning model 222 to generate a predicted-requestor rating. In accordance with one or more embodiments, FIG. 5B illustrates the cancellation management system 105 applying the requestor-experience-rating-machine-learning model 222 to generate a predicted-requestor rating.

As shown in FIG. 5A, the cancellation management system 105 provides training transportation features 502 to the requestor-experience-rating-machine-learning model 222. The requestor-experience-rating-machine-learning model 222 can include a support vector machine, a convolutional neural network, a decision tree, among other types of machine-learning models described above. Accordingly, the cancellation management system 105 can modify the training process shown in FIG. 5A depending on the type of machine-learning model(s) that the requestor-experience-rating-machine-learning model 222 comprises. For example, in the event the requestor-experience-rating-machine-learning model 222 is a decision tree model, the cancellation management system 105 can train individual nodes according to particular classification rules for determining various attributes or features.

In each training iteration, training transportation features correspond to a transportation request. The training transportation features 502 can include, for example, (i) an amount of time for matching a first shared-transportation request with a transportation provider, (ii) a predicted time or a predicted distance of detour for transport of a first requestor to a drop-off location, and/or (iii) an estimated time of arrival of the transportation provider at a pickup location of the first requestor. Additional or alternative examples of transportation features can include, but are not limited to: (iv) one or more of the training transportation features 302, (v) one or more of the training transportation features 402, (vi) an amount of unmatched time (e.g., between submitting a transportation request and acceptance of the transportation request), (vii) an ETA for pickup, (viii) an amount of detour time, (ix) a distance to the drop-off location (e.g., based on coordinates for longitude and latitude), (x) a distance to the pick-up pickup location (e.g., based on coordinates for longitude and latitude), (xi) an upfront fare amount, (xii) an amount of time for matching, (xiii) a courier discount percentage, (xiv) a local time or day of the week or month, (xv) a number of detour stops, (xvi) a number of other requestors' pickup stops prior to the pickup location, (xvii) a primetime percentage (e.g., rush hour percentage), (xviii) a number of waypoints before, during, and/or after a transportation, etc. In these or other embodiments, the training transportation features 502 relating to distance may be Haversine distances, and may be in any suitable unit of distance (e.g., meters). Further, the training transportation features 502 relating to time may be in any suitable unit of time (e.g., seconds).

Based on one or more of the foregoing training transportation features 502, the requestor-experience-rating-machine-learning model 222 generates a training requestor rating 504 in an initial training iteration. As part of the initial training iteration, the cancellation management system 105 compares ground-truth-requestor rating 506 to the training requestor rating 504 to determine a loss. For example, the initial training iteration can include a comparison of (i) the training requestor rating 504 in the form of a predicted probability that a particular requestor experience will be rated as good, bad, etc. and (ii) the ground-truth-requestor rating 506 in the form of an actual requestor rating of the requestor experience. Specifically, in some implementations, the cancellation management system 105 compares (i) a training requestor rating of a predicted probability that a particular requestor experience will be rated as bad with (ii) a ground-truth requestor rating as a binary outcome of whether the requestor rating was actually rated as good or bad. In some embodiments, the ground-truth-requestor rating 506 includes a predicted-requestor rating associated with an experience based on transportation features. As shown in FIG. 5A, the ground-truth-requestor rating 506 corresponds to the training transportation features 502 and are based on requestor rating data for converted/cancelled transportations that include various transportation features. For example, the cancellation management system 105 can compare the training requestor rating 504 with the ground-truth-requestor rating 506 to determine a loss using a loss function 508.

As shown in FIG. 5A, the loss function 508 can include, but is not limited to, a regression loss function (e.g., a mean square error function, a quadratic loss function, an L2 loss function, a mean absolute error/L1 loss function, mean bias error). Additionally, or alternatively, the loss function 508 can include a classification loss function (e.g., a hinge loss/multi-class SVM loss function, cross entropy loss/ negative log likelihood function).

Further, the loss function 508 can return quantifiable data regarding the difference between the training requestor rating 504 and the ground-truth-requestor rating 506. In particular, the loss function 508 can return such loss data to the requestor-experience-rating-machine-learning model 222 based upon which the cancellation management system 105 adjusts various parameters/hyperparameters to improve the quality/accuracy of training feedback probabilities in subsequent training iterations—by narrowing the difference between the training requestor rating and ground-truth-requestor rating.

In some embodiments, the loss function 508 can include an Adam optimizer for intelligently adjusting weights and various parameters/hyperparameters within the requestor-experience-rating-machine-learning model 222. Moreover, the training of the requestor-experience-rating-machine-learning model 222 can be an iterative process (as shown by the return arrow between the loss function 508 and the requestor-experience-rating-machine-learning model 222) such that the cancellation management system 105 continually adjusts parameters/hyperparameters of requestor-experience-rating-machine-learning model 222 over training iterations.

After modifying parameters of the requestor-experience-rating-machine-learning model 222 for an initial training iteration, in certain implementations, the cancellation management system 105 performs additional training iterations. In a subsequent training iteration, for instance, the cancellation management system 105 generates subsequent training requestor ratings based on a different set of training transportation features. The cancellation management system 105 further compares the subsequent training requestor ratings to subsequent ground-truth-requestor ratings using the loss function 508 and modifies parameters of the requestor-experience-rating-machine-learning model 222 based on a determined loss.

By iteratively determining losses from a comparison of training requestor ratings and ground-truth-requestor ratings, the cancellation management system 105 trains the requestor-experience-rating-machine-learning model 222 to generate a predicted-requestor rating. In some cases, the cancellation management system 105 performs training iterations until the parameters (e.g., values or weights) of the requestor-experience-rating-machine-learning model 222 do not change significantly across training iterations or otherwise satisfy a convergence criteria.

After training the requestor-experience-rating-machine-learning model 222, the cancellation management system 105 applies a trained version of the requestor-experience-rating-machine-learning model 222. In accordance with one or more embodiments, FIG. 5B illustrates the cancellation management system 105 applying the requestor-experience-rating-machine-learning model 222 to generate a predicted-requestor rating 512 based on transportation features 510. As indicated above, the transportation features 510 correspond to a transportation request-either for a single transportation request or a shared-transportation request. Similarly, the transportation features 510 may include any of the example features described above from the training transportation features 502.

As mentioned above, in some embodiments, the requestor-experience-rating-machine-learning model 222 generates the predicted-requestor rating 512. For example, in certain implementations, the requestor-experience-rating-machine-learning model 222 generates the predicted-requestor rating 512 comprising a predicted requestor rating for an experience based on transportation features.

In these or other embodiments, the cancellation management system 105 converts the predicted-requestor rating 512 to a routing weight. By applying a routing weight to different potential transportation routes, the cancellation management system 105 can filter transportation routes and select a transportation route (or an alternative transportation route) for a transportation provider based on transportation features. Such as transportation features predicted to affect an experience for a requestor associated with a given transportation route. As an example, the cancellation management system 105 may convert the predicted-requestor rating 512 (e.g., a low predicted-requestor rating) to a higher routing weight (e.g., negative eight dollars).

In some embodiments, the cancellation management system 105 further applies the predicted-requestor rating 512 to the net gain computation described above as an addition (or an alternative) to one or more of the adjusted transportation-value metric, the conversion-benefit metric, etc. Additionally, or alternatively, in some embodiments, the cancellation management system 105 can apply a routing weight to the net gain computation described above as an addition (or an alternative) to one or more of the adjusted transportation-value metric, the conversion-benefit metric, etc.

For instance, if the conversion-benefit metric plus an amount of collected cancellation fees (from the assessed cancellation penalty) minus a routing weight and minus provider payout fees for cancellation of the transportation request amounts to a negative net gain value, the cancellation management system 105 determines to waive a cancellation penalty for a requestor cancelling a transportation request. Otherwise, if the net gain is a positive value, the cancellation management system 105 determines to assess the cancellation penalty for a requestor cancelling a transportation request. Thus, in some embodiments, the cancellation management system 105 determines to provide the cancellation penalty for cancelling transportation requests associated with a higher predicted-requestor rating 512 and/or a low routing weight.

Figure 6A:
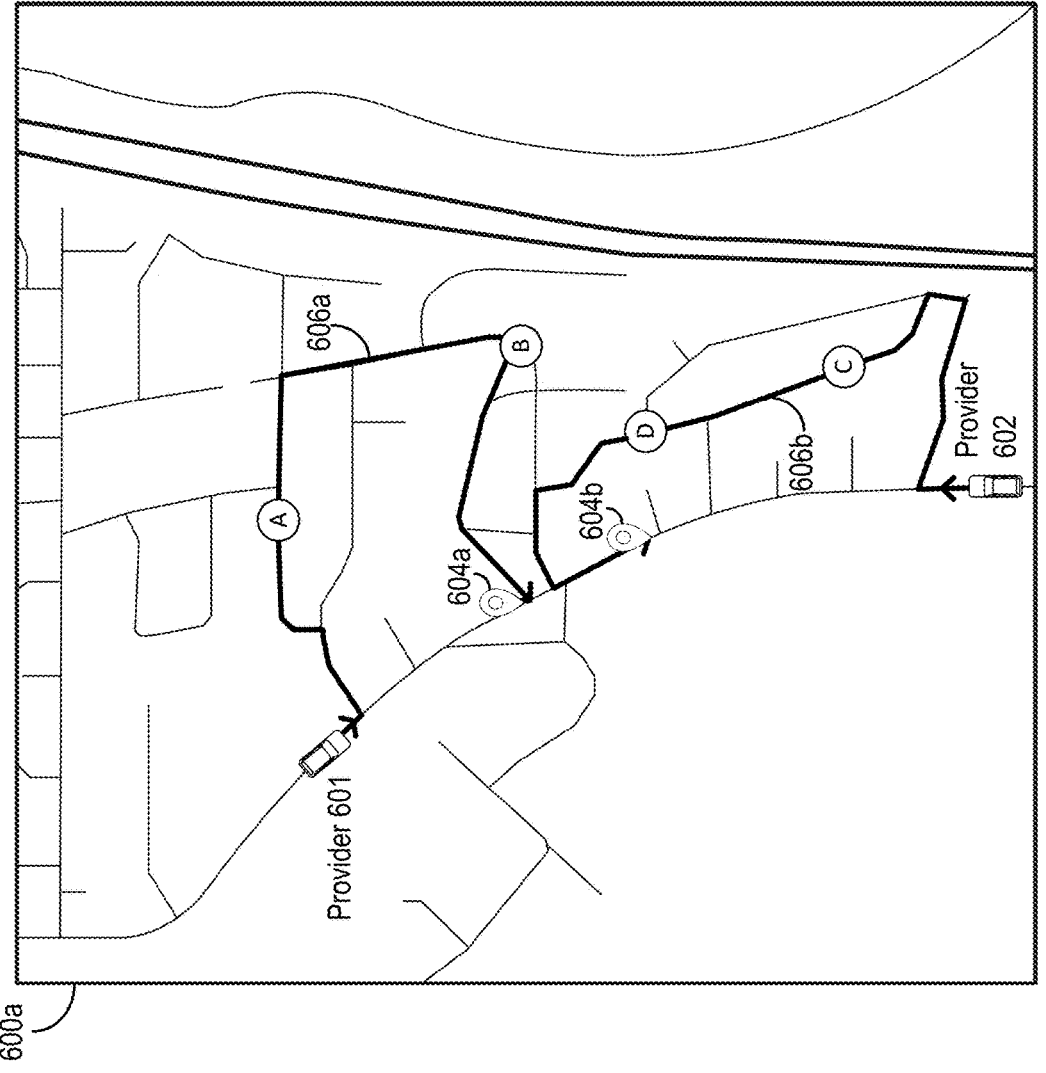
FIGS. 6A-6B illustrate projected transportation routes as a basis for a transportation efficiency model to generate a transportation efficiency metric in accordance with one or more embodiments.
Figure 6B:
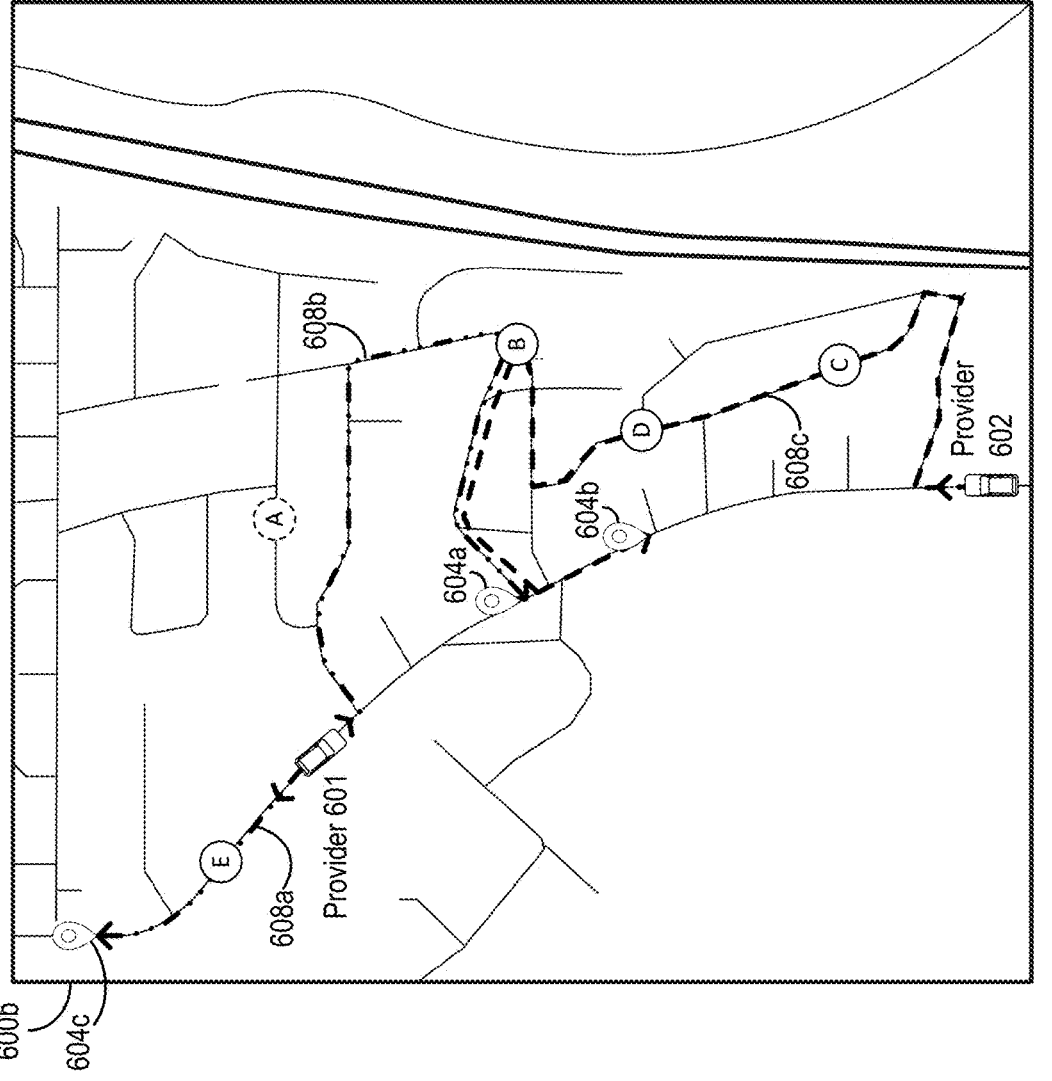

As mentioned above, the transportation efficiency model 206 can generate one or more projected values to determine a transportation efficiency metric for dynamically providing a customized cancellation notice. To generate a transportation efficiency metric, for example, the cancellation management system 105 can determine a difference between (i) a first projected value of a transportation provider transporting a first requestor and a second requestor along the projected transportation route as part of a shared transportation and (ii) a second projected value of transporting the second requestor along an alternative projected transportation route. In accordance with one or more embodiments, FIGS. 6A-6B illustrate projected transportation routes as bases for a transportation efficiency model to generate a transportation efficiency metric. In particular, FIGS. 6A-6B depict map diagrams including four requestors A-D for shared transport and two transportation providers (provider 601 and provider 602) corresponding to different transportation routes. As explained below, the cancellation management system 105 can utilize the transportation efficiency model 206 to generate projected values of the transportation routes depicted in FIGS. 6A and 6B.

As shown in a map diagram 600a of FIG. 6A, the dynamic transportation matching system 104 determines (i) a first projected transportation route 606a for provider 601 to transport requestors A and B to a drop-off location 604a and (ii) a second projected transportation route 606b for provider 602 to transport requestors C and D to drop-off location 604b. In some embodiments, the cancellation management system 105 can utilize the transportation efficiency model 206 to generate a first projected value for the first projected transportation route 606a and a second projected value for the second projected transportation route 606b. To generate the first projected value, the transportation efficiency model 206 may determine a cost contribution, a revenue contribution, or a profit contribution for transporting both requestors A and B according to the first projected transportation route 606a.

In some such embodiments, the transportation efficiency model 206 associates requestor A with a first portion of a total cost, revenue, or profit contribution and requestor B with a second portion of the total cost, revenue, or profit contribution. In some embodiments, at least some of the first portion and the second portion of the total cost, revenue, or profit contribution overlaps with each other. In this case, the transportation efficiency model 206 may determine an amount of shared costs, for example, where picking up requestor B or transporting requestor B is on the way to dropping off requestor A. Accordingly, the transportation efficiency model 206 can account for some of the costs for transporting requestor A as shared with transporting requestor B.

As further indicated by FIG. 6A, the transportation efficiency model 206 can similarly determine the second projected value for the second projected transportation route 606b for provider 602. Consistent with the disclosure above, the transportation efficiency model 206 may determine a cost contribution, a revenue contribution, or a profit contribution for the provider 602 to transport both requestors C and D according to the second projected transportation route 606b.

FIG. 6B illustrates a map diagram 600b in which a requestor device of a shared-transportation route sends an indication of modifying a shared-transportation request (e.g., cancelling or selection to editing a shared-transportation request). Based on receiving the indication to modify the shared-transportation request, the cancellation management system 105 generates alternative projected transportation routes and associated projected values in accordance with one or more embodiments of the present disclosure.

As shown in FIG. 6B, requestor A is denoted with a dotted circle indicating that a requestor client device for requestor A sends an indication of a selection to modify a shared-transportation request. In response, the transportation efficiency model 206 and/or the dynamic transportation matching system 104 generate alternative projected transportation routes without the requestor A. As shown in FIG. 6B, for example, the transportation efficiency model 206 determines a first alternative projected transportation route 608a for provider 601 that foregoes transporting requestor B and instead transports requestor E to a drop-off location 604c. Additionally, the transportation efficiency model 206 determines a second alternative projected transportation route 608b for the provider 601 to transport requestor B to the drop-off location 604a.

As further shown in FIG. 6B, the transportation efficiency model 206 determines a third alternative projected transportation route 608c to transport the requestors C and D to the drop-off location 604b and the requestor B to the drop-off location 604a. Though the transportation efficiency model 206 and/or the dynamic transportation matching system 104 may assign one or more of the transportation providers (e.g., the providers 601 and 602) to a host of other projected alternative transportation routes that are not shown, those illustrated are provided for simplicity of explanation. Consistent with the disclosure above, the transportation efficiency model 206 can determine projected values for one or more of the alternative projected transportation routes.

To generate a transportation efficiency metric, in some embodiments, the transportation efficiency model 206 compares and determines a difference between or among one or more of the projected values. For example, the transportation efficiency model 206 may compare and determine a difference between (i) the first projected value for the first projected transportation route 606a and each of (ii) a first alternative projected value for the first alternative projected route 608a and the second alternative projected value for the second alternative projected transportation route 608b. Additionally, the transportation efficiency model 206 may compare and determine a difference between (i) the second projected value for the second alternative projected transportation route 608b and (ii) the third alternative projected value for the third alternative projected transportation route 608c.

Based on the comparisons, the transportation efficiency model 206 may determine a transportation efficiency metric indicating a net efficiency loss or gain by not transporting the requestor A—should the requestor A cancel—and selecting an alternative projected route for transporting other requestors. In turn, the cancellation management system 105 may utilize the transportation efficiency metric to determine whether to provide a customized cancellation notice to a requestor client device of the requestor A that includes a cancellation penalty. To provide the customized cancellation notice to a requestor client device of the requestor A prior to confirming cancellation of the shared-transportation request, the transportation efficiency model 206 may generate (in real time or approximately real time) the foregoing projected values and alternative projected values to determine the transportation efficiency metric.

As mentioned above, the cancellation management system 105 can dynamically provide a customized cancellation notice to a requestor device in response to receiving an indication of a selection to cancel a transportation request. In accordance with one or more embodiments of the present disclosure, FIGS. 7A-7G illustrate a requestor client device 702 and user interfaces 704a-704g. As explained below, the cancellation management system 105 provides a customized cancellation notice to the requestor client device 702 in response to various user inputs at the user interfaces 704a-704g.

FIGS. 7A-7G likewise each depict the requestor client device 702 comprising a requestor client application for the dynamic transportation matching system 104. In some embodiments, the requestor client application comprises computer-executable instructions that cause the requestor client device 702 to perform certain actions depicted in FIGS. 7A-7G, such as presenting a graphical user interface of the requestor client application. Rather than refer to the dynamic transportation matching system 104 or the cancellation management system 105 as performing the actions depicted in FIGS. 7A-7G below, this disclosure will generally refer to the requestor client device 702 for simplicity.

Figure 7B:
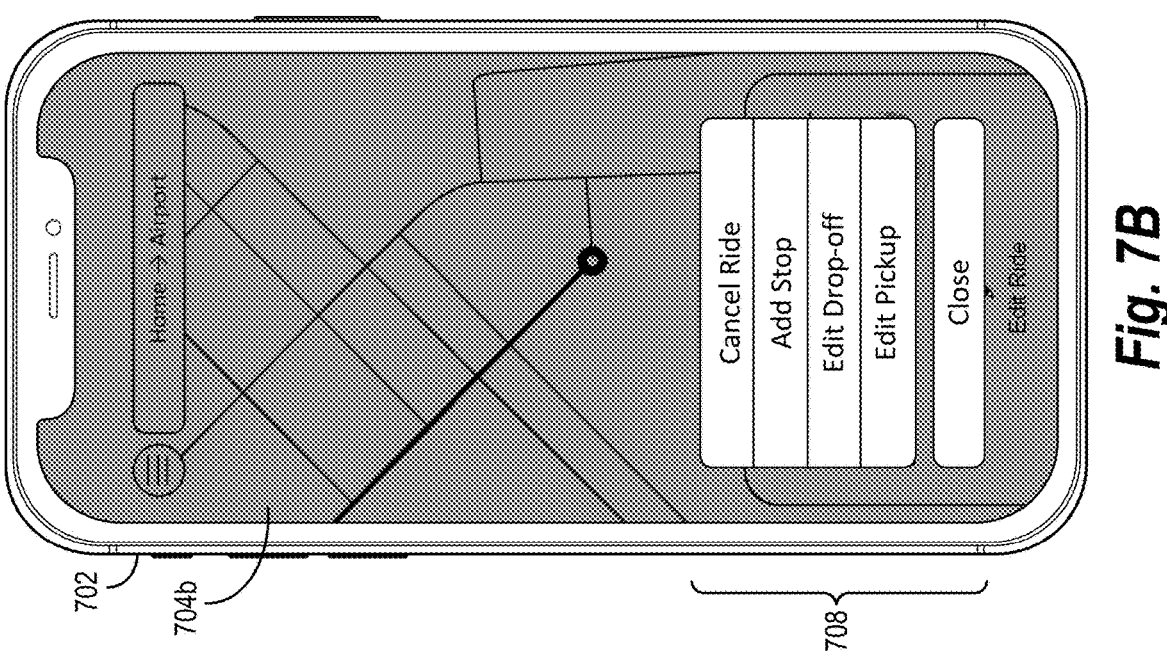
FIGS. 7A-7I illustrate a client device presenting graphical user interfaces for cancelling a transportation request and providing a customized cancellation notice in accordance with one or more embodiments.
Figure 7A:
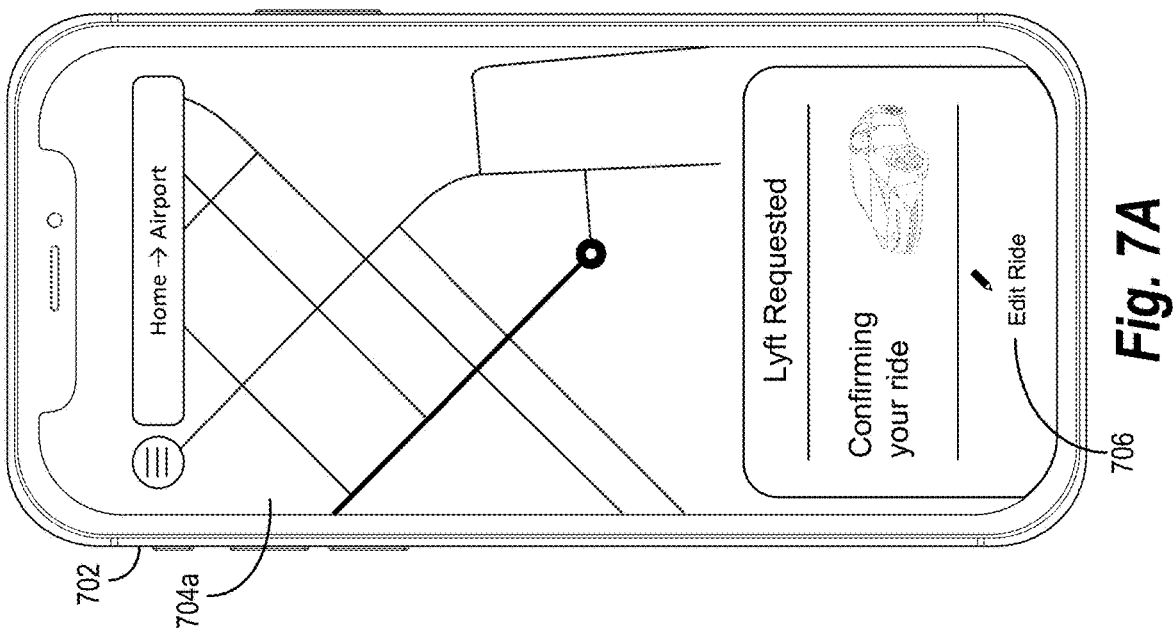

As shown in FIG. 7A, for example, the user interface 704a includes an element 706 to "edit" a transportation request recently submitted (e.g., as indicated by the statement "confirming your ride"). In response to detecting a user input at the element 706, the requestor client device 702 presents the user interface 704b comprising a menu 708 of selectable options for editing a transportation request. As shown in FIG. 7B, the menu 708 includes selectable options to cancel a transportation request, add a stop location, edit a drop-off location, edit a pick-up location, or close the menu 708.

Figure 7D:
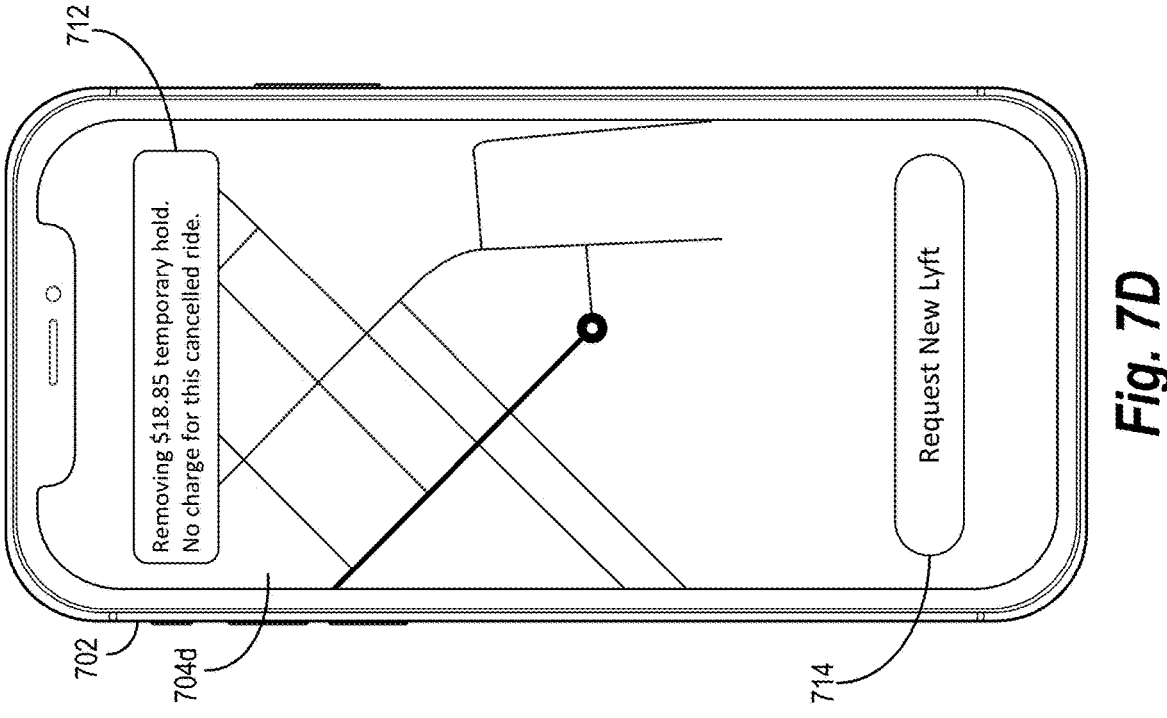
Figure 7C:
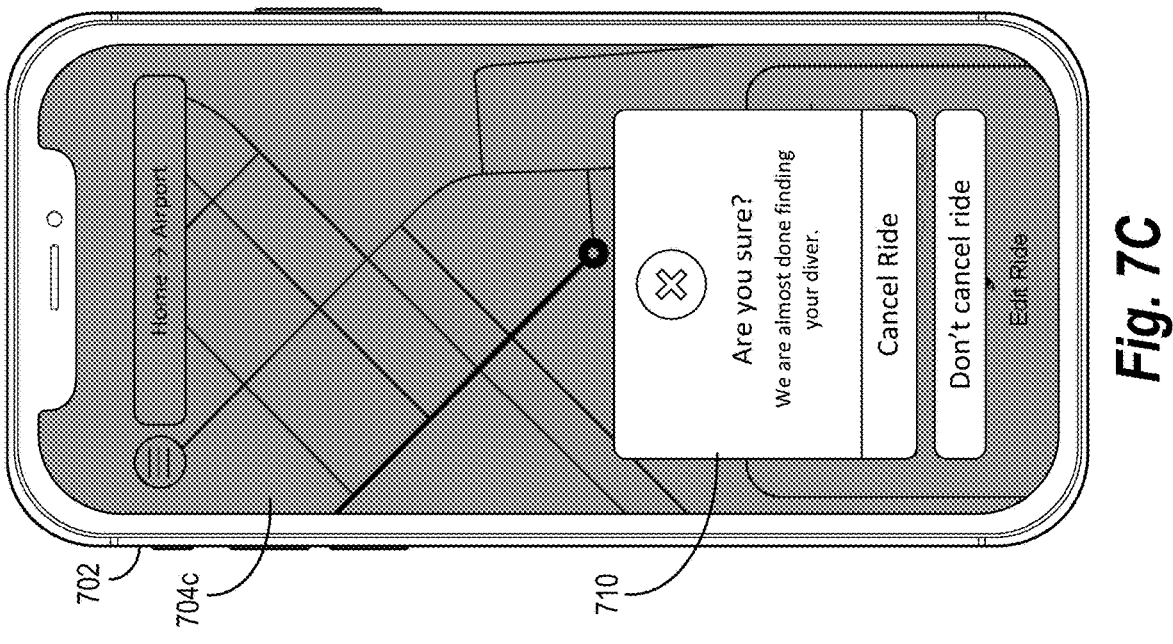

As indicated by FIG. 7C, in response to detecting an additional user input at the selectable option to cancel the transportation request in the menu 708, the requestor client device 702 sends an indication of the selection to cancel to the cancellation management system 105. In response to either an indication to edit the transportation request or an indication of the selection to cancel the transportation request, the cancellation management system 105 determines whether to assess a cancellation penalty against the requestor-if the request cancels the transportation request-based on transportation features corresponding to the transportation request. Based on a determination not to assess the cancellation penalty, the dynamic transportation matching system 104 or the cancellation management system 105 provides a customized cancellation notice for display by the requestor client device 702.

Upon receipt of such a customized cancellation notice from the dynamic transportation matching system 104 or the cancellation management system 105, the requestor client device 702 presents the user interface 704c comprising a customized cancellation notice 710. The customized cancellation notice 710 does not include or reference a cancellation penalty. As indicated by FIG. 7C, the requestor client device 702 detects a selection by the requestor to confirm cancellation of the transportation request without the requestor incurring a cancellation penalty.

As shown in FIG. 7D, the requestor client device 702 presents the user interface 704d comprising a customized-cancellation-confirmation notice 712. The customized-cancellation-confirmation notice 712 confirms that the upfront fare amount has been removed (i.e., not charged) and that no cancellation penalty has been assessed against the requestor. In addition, the user interface 704d provides a new-request element 714 that can create a new transportation request.

As indicated above, in some embodiments, the cancellation management system 105 provides a customized cancellation notice including a cancellation penalty in response to receiving an indication of a requestor cancelling a transportation request. As shown in FIG. 7E, the requestor client device 702 presents a user interface 704 comprising a customized cancellation notice 716. In this particular embodiment, the customized cancellation notice 716 includes selectable options for confirming an edit to a transportation request following a period of time from submitting the transportation request (e.g., when the transportation provider is en route). As shown, the customized cancellation notice 716 includes selectable options to call the transportation provider, edit a pickup location, cancel the transportation request, and not cancel the transportation request. Additionally, the customized cancellation notice 716 indicates an amount of time (in this case, eight minutes) until the next available transportation provider can provide transportation services. Alternatively, the customized cancellation notice 716 can more generally indicate the possibility that the next available driver is farther away.

Figure 7F:
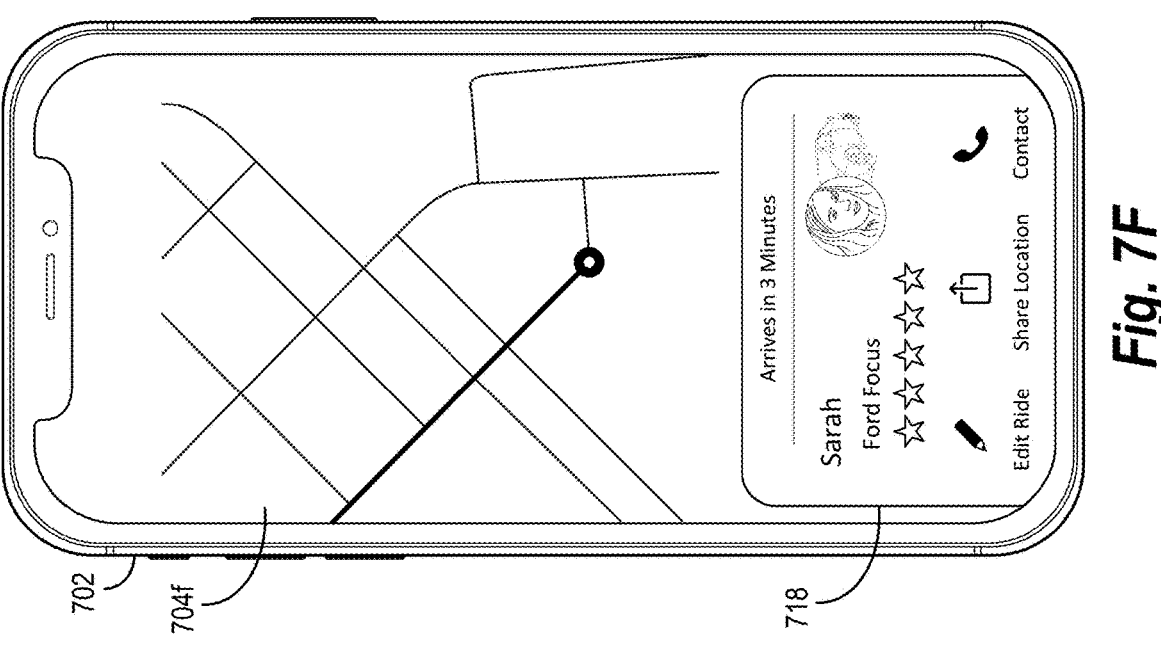
Figure 7E:
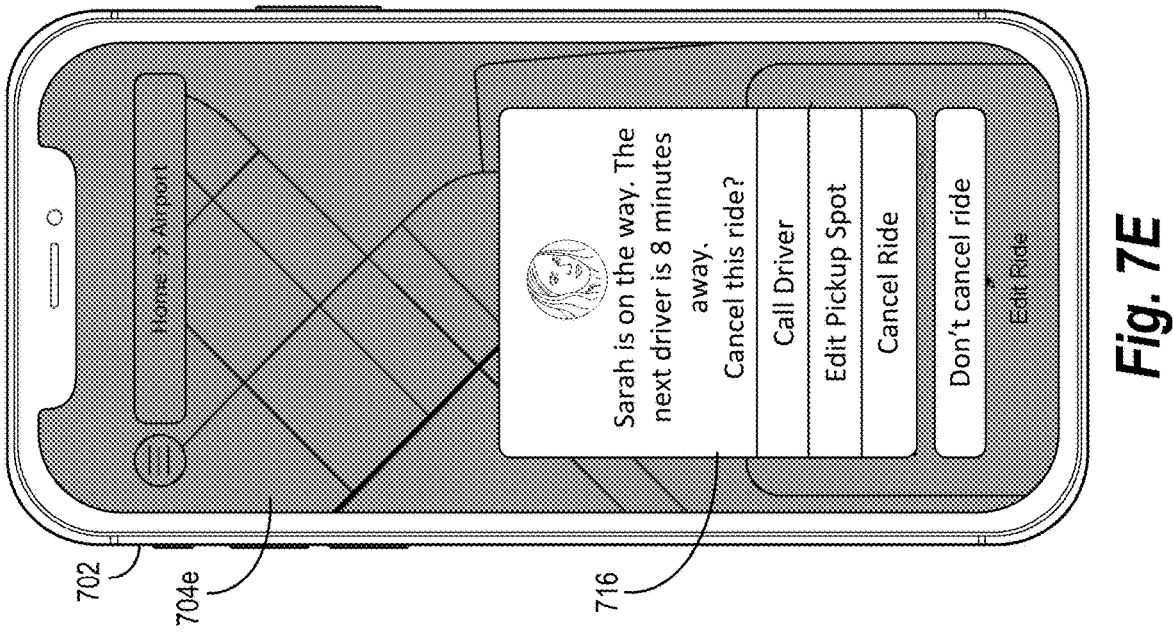

As shown in FIG. 7F, the requestor client device 702 detects a selection by the requestor to not cancel the transportation request at the user interface 704e. In response to detecting the selection, the requestor client device 702 presents the user interface 704f comprising an update notification 718. The update notification 718 identifies an estimated time of arrival for a provider in response to the transportation request.

Figure 7H:
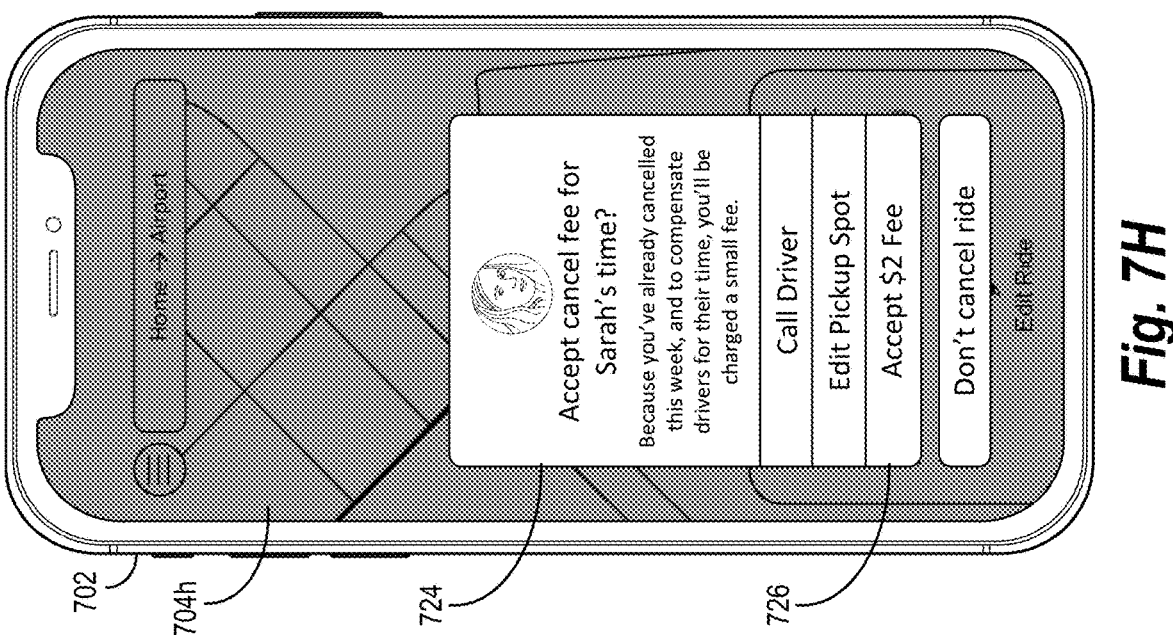
Figure 7G:
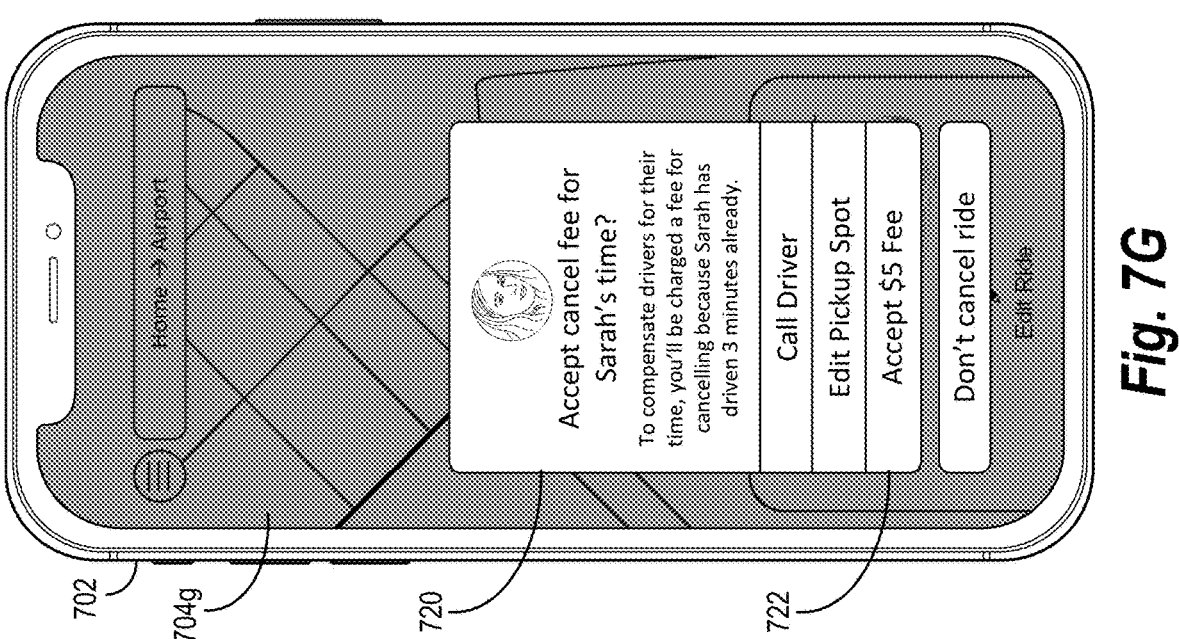

As shown in FIG. 7G, by contrast, the requestor client device 702 detects a selection by the requestor to cancel the transportation request at the user interface 704e. In response to detecting the selection, the requestor client device 702 sends an indication of the selection to cancel to the cancellation management system 105. In response to either an indication to edit the transportation request or an indication of the selection to cancel the transportation request, the cancellation management system 105 determines whether to assess a cancellation penalty against the requestor—if the request cancels the transportation request—based on transportation features corresponding to the transportation request. Based on a determination to assess the cancellation penalty, the dynamic transportation matching system 104 or the cancellation management system 105 provides a customized cancellation notice for display by the requestor client device 702.

Upon receipt of such a customized cancellation notice from the dynamic transportation matching system 104 or the cancellation management system 105, the requestor client device 702 presents the user interface 704g comprising a customized cancellation notice 720. As shown in FIG. 7G, the customized cancellation notice 720 includes a cancellation penalty 722.

As suggested above, the cancellation management system 105 can customize a cancellation notice to include a cancellation-penalty amount reflecting the amount of corresponding conversion probabilities or feedback probabilities selected by the cancellation management system 105. The cancellation management system 105 can likewise customize a cancellation notice to include a message reflecting the transportation features analyzed by the cancellation management system 105. In the alternative to the customized cancellation notice 722 from FIG. 7G, FIG. 7H accordingly illustrates a customized cancellation notice 724 that includes a cancellation penalty 726 comprising an amount smaller than that of the cancellation penalty 722 of FIG. 7G.

For example, in response to detecting a selection by the requestor to cancel the transportation request at the user interface 704e, the cancellation management system 105 determines whether to assess a cancellation penalty against the requestor—if the request cancels the transportation request—based on transportation features corresponding to the transportation request. Based on a determination to assess the cancellation penalty, the dynamic transportation matching system 104 or the cancellation management system 105 provides the customized cancellation notice 724 for display by the requestor client device 702 in the user interface 704h.

As indicated by a comparison of FIGS. 7G and 7H, the cancellation management system 105 can customize a message (within a customized cancellation notice) based on transportation features. As shown by FIG. 7G, for instance, the cancellation management system 105 customizes a message within the customized cancellation notice 720 to reflect a transportation feature indicating an amount of time between the transportation provider accepting the transportation request and the requestor cancelling the transportation request. As shown by FIG. 7H, the cancellation management system 105 customizes a message within the customized cancellation notice 724 to reflect a transportation feature indicating a number of cancelled transportation requests for the requestor. While FIGS. 7G and 7H provide a couple of examples, the cancellation management system 105 can customize a message to reflect any transportation feature described above.

Figure 7I:
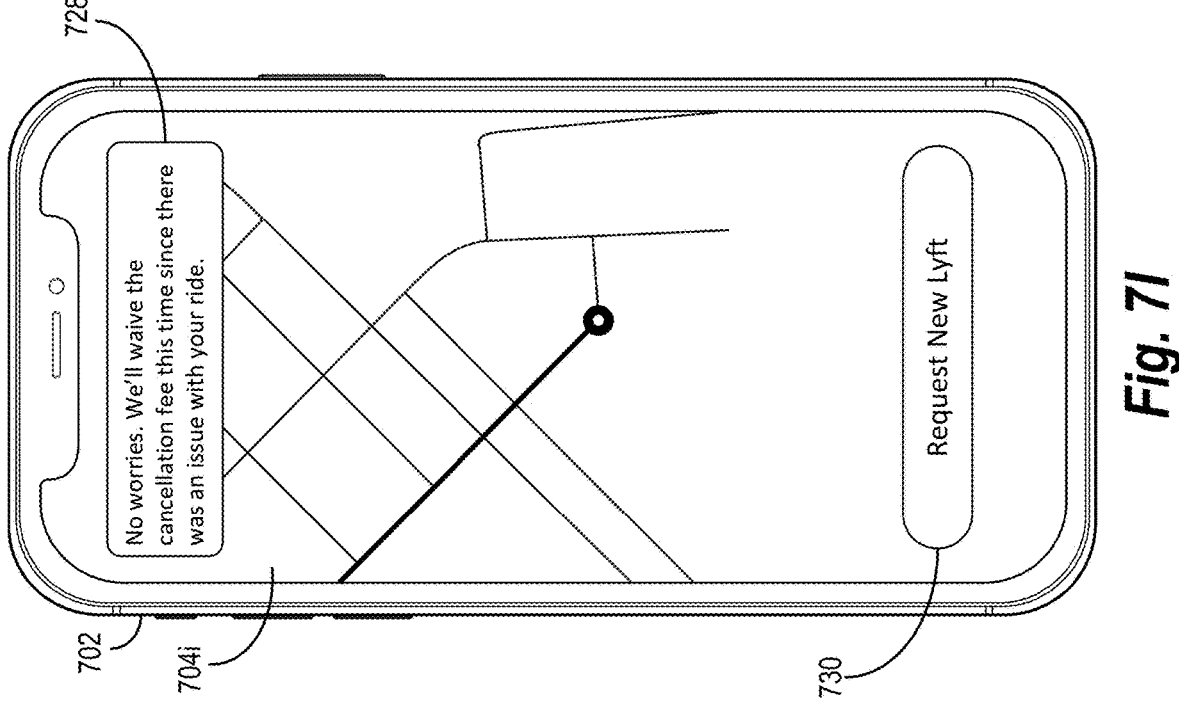

When the cancellation management system 105 determines not to impose a cancellation penalty in response to a cancellation request, the cancellation management system 105 can likewise customize a message in a customized-cancellation-confirmation notice. In the alternative to the customized-cancellation-confirmation notice 712 shown in FIG. 7D, FIG. 7I illustrates the requestor client device 702 presenting a user interface 704i comprising a customized-cancellation-confirmation notice 728. The customized-cancellation-confirmation notice 728 confirms that no cancellation penalty has been assessed against the requestor, in this case due to an issue with the transportation. In some implementations, the customized-cancellation-confirmation notice 728 specifies the issue (e.g., because it is taking longer than expected to pick up the requestor). In addition, the user interface 704i provides a new-request element 730 that can create a new transportation request.

Figure 8:
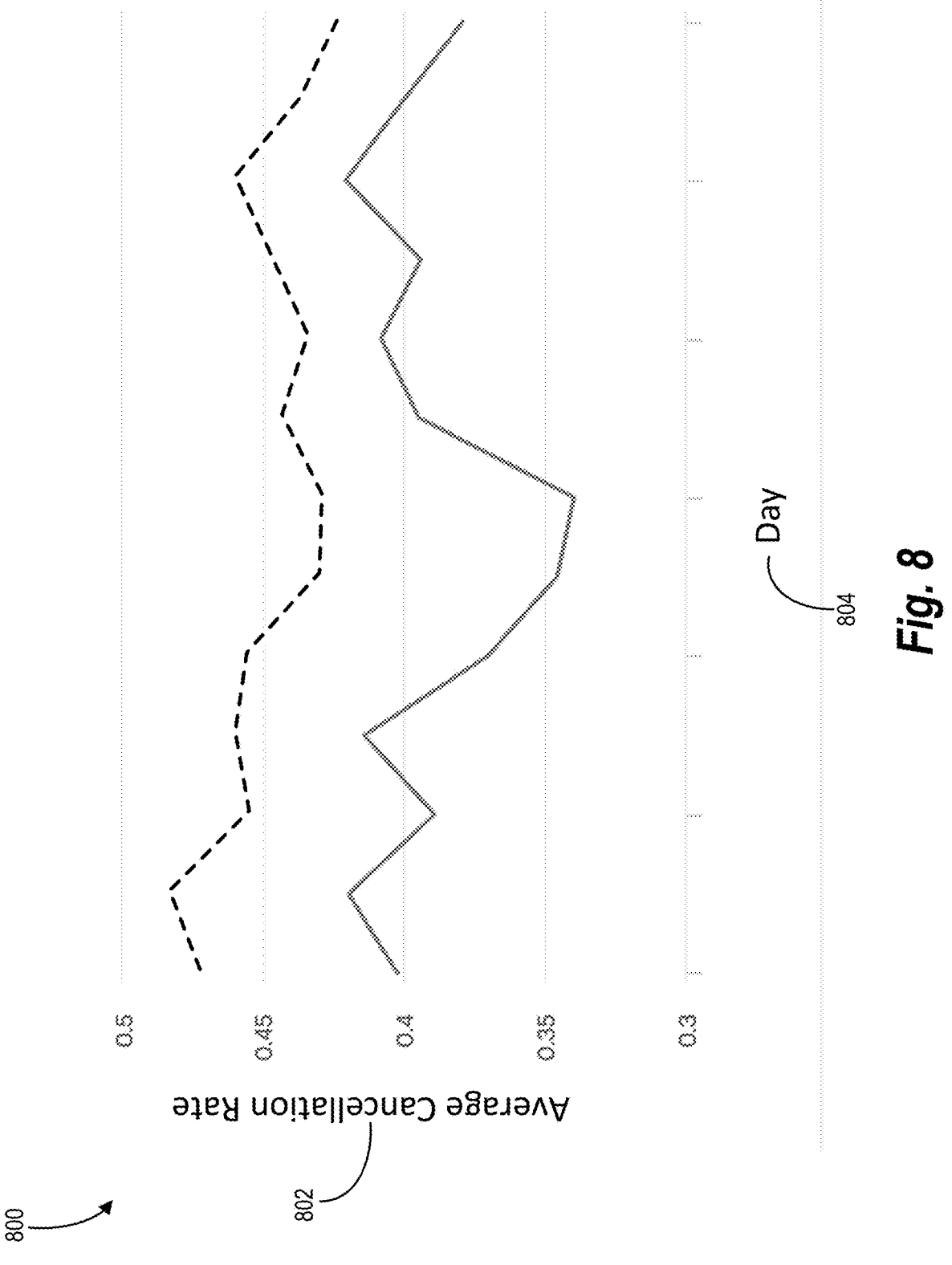
FIG. 8 illustrates experimental results from implementing a conversion-machine-learning model in accordance with one or more embodiments.

As mentioned above, the conversion-machine-learning model has shown approximately a ten percent improvement in increased conversions based on improved accuracy of conversion probabilities. In accordance with one or more embodiments, FIG. 8 illustrates a graph 800 of experimental results depicting decreased cancellation rates when employing the conversion-machine-learning model as described above. In particular, the graph 800 illustrates an average-cancellation-rate axis 802 indicating an average cancellation rate by day indicated in the day axis 804.

As shown in FIG. 8, the graph 800 includes (a) a dotted line indicating an average cancellation rate corresponding to notices from a conventional system that does not use a conversion-machine-learning model or a requestor-feedback-machine-learning model and (b) a solid line indicating an average cancellation rate corresponding to notices from the cancellation management system 105 using both a conversion-machine-learning model and a requestor-feedback-machine-learning model. As dotted and solid lines from the graph 800 demonstrate, the cancellation management system 105 lowers the average cancellation rate across time by using a conversion-machine-learning model and a requestor-feedback-machine-learning model.

In particular, the conventional system determines whether to assess cancellation penalties and provides corresponding notices resulting in an average cancellation rate by day shown in the dotted line as follows in half-day increments: (i) 0.47, (ii) 0.48, (iii) 0.455, (iv) 0.46, (v) 0.455, (vi) 0.43, (vii) 0.43, (viii) 0.445, (ix) 0.44, (x) 0.45, (xi) 0.46, (xii)

0.435, and (xiii) 0.425. Further, the cancellation management system 105 determines whether to assess cancellation penalties and provides corresponding notices resulting in an average cancellation rate by day shown in the dotted line as follows in half-day increments: (i) 0.40, (ii) 0.44, (iii) 0.390, (iv) 0.43, (v) 0.37, (vi) 0.345, (vii) 0.34, (viii) 0.395, (ix) 0.41, (x) 0.395, (xi) 0.42, (xii) 0.40, and (xiii) 0.375. FIG. 8 indicates that the conversion-machine-learning model generate conversion probabilities—and the requestor-feedback-machine-learning model generate feedback probabilities— that improve conversion rates, as discussed above and with respect to FIGS. 2A-2B, 3A-3B, and 4A-4B.

Turning now to FIG. 9, additional detail is provided regarding a computing system 900, including components and capabilities of the cancellation management system 105 in accordance with one or more embodiments. As shown, the cancellation management system 105 is implemented by a computing device 902, including the dynamic transportation matching system 104. In some embodiments, the components of the cancellation management system 105 can be implemented by a single device (e.g., the server(s) 102, the requestor client devices 116a-116n, the provider client devices 110a-110n of FIG. 1) or multiple devices. As shown, the cancellation management system 105 includes a transportation request facility 904, a transportation feature engine 906, a conversion-machine-learning model 908, a requestor-feedback-machine-learning model 910, a requestor-experience-rating-machine-learning model 912, a transportation efficiency model 914, a user interface engine 916, and a data storage facility 918. Each is discussed in turn below.

As just mentioned, the cancellation management system 105 includes the transportation request facility 904. The transportation request facility 904 can identify, receive, edit, transmit, and/or store transportation requests. For example, as discussed above, the transportation request facility 904 can receive an indication to modify or cancel the transportation request.

The cancellation management system 105 also includes the transportation feature engine 906. The transportation feature engine 906 can identify, generate, store, and/or otherwise obtain transportation features. For example, as discussed above, the transportation feature engine 906 can provide transportation features to one or more of the conversion-machine-learning model 908, the requestor-feedback-machine-learning model 910, the requestor-experience-rating-machine-learning model 912, or the transportation efficiency model 914 for utilization thereof.

Further shown in FIG. 9, the cancellation management system 105 includes the conversion-machine-learning model 908. The conversion-machine-learning model 908 may be the same as (or similar to) the conversion-machine-learning model 202 described above and can generate conversion probabilities based on receiving/obtaining transportation features when trained using training transportation features. For example, the conversion-machine-learning model 908 can generate (i) a first conversion probability associated with assessing a cancellation penalty for cancelling a transportation request and (ii) a second conversion probability associated with not assessing a cancellation penalty for cancelling the transportation request. Additionally, or alternatively, the conversion-machine-learning model 908 can provide the first conversion probability and the second conversion probability to the cancellation management system 105 for determining to provide a customized cancellation notice.

In addition, the cancellation management system 105 includes the requestor-feedback-machine-learning model

910. The requestor-feedback-machine-learning model 910 may be the same as (or similar to) the requestor-feedback-machine-learning model 218 described above and can generate a feedback probability based on receiving/obtaining transportation features when trained using training transportation features. For example, the requestor-feedback-machine-learning model 910 can generate a feedback probability based on a particular set of transportation features and/or apply the feedback probability to a transportation-value metric for the requestor. Additionally, or alternatively, the requestor-feedback-machine-learning model 910 can provide the feedback probability to the cancellation management system 105 for determining to provide a customized cancellation notice.

Further, the cancellation management system 105 includes the requestor-experience-rating-machine-learning model 912. The requestor-experience-rating-machine-learning model 912 may be the same as (or similar to) the requestor-experience-rating-machine-learning model 222 described above. The requestor-experience-rating-machine-learning model 912 can generate a predicted-requestor rating based on receiving/obtaining transportation features when trained using training transportation features. For example, the requestor-experience-rating-machine-learning model 912 can generate a predicted-requestor rating based on a particular set of transportation features, and in addition, convert the predicted-requestor rating to a routing weight. Additionally, or alternatively, the requestor-experience-rating-machine-learning model 912 can provide the predicted-requestor rating and/or the routing weight to the cancellation management system 105 for determining to provide a customized cancellation notice.

The cancellation management system 105 further includes the transportation efficiency model 914. The transportation efficiency model 914 may be the same as (or similar to) the transportation efficiency model 206 described above and can generate a transportation efficiency metric accounting for a computational resource usage, an amount of time, a projected value (e.g., monetary cost or profit margin), a transportation provider usage, etc. Additionally, or alternatively, the transportation efficiency model 914 can provide the transportation efficiency metric to the cancellation management system 105 for determining to provide a customized cancellation notice.

As also shown in FIG. 9, the cancellation management system 105 can include the user interface engine 916. The user interface engine 916 can provide, manage, and/or control a graphical user interface (or simply "user interface"). In particular, the user interface engine 916 may provide for display (or generate and display) a user interface by way of a display screen composed of a set of graphical components, objects, and/or elements that allow a user to perform a function. For example, the user interface engine 916 can receive user inputs from a user, such as a click/tap to edit a transportation request. Additionally, the user interface engine 916 can present a variety of types of information, including text, digital media items, navigation directions, transportation matching digital content, custom cancellation notices, etc.

The data storage facility 918 maintains data for the cancellation management system 105. The data storage facility 918 can maintain data of any type, size, or kind, as necessary to perform the functions of the cancellation management system 105.

Each of the components of the computing device 902 can include software, hardware, or both. For example, the components of the computing device 902 can include one or more instructions stored on a computer-readable storage medium and executable by processors of one or more computing devices, such as a client device or a server device. When executed by the one or more processors, the computer-executable instructions of the cancellation management system 105 can cause the computing device(s) (e.g., the computing device 902) to perform the methods described herein. Alternatively, the components of the computing device 902 can include hardware, such as a special-purpose processing device to perform a certain function or group of functions. Alternatively, the components of the computing device 902 can include a combination of computer-executable instructions and hardware.

Furthermore, the components of the computing device 902 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 902 may be implemented as a stand-alone application, such as a desktop or mobile application. Furthermore, the components of the computing device 902 may be implemented as one or more web-based applications hosted on a remote server.

Figure 10A:
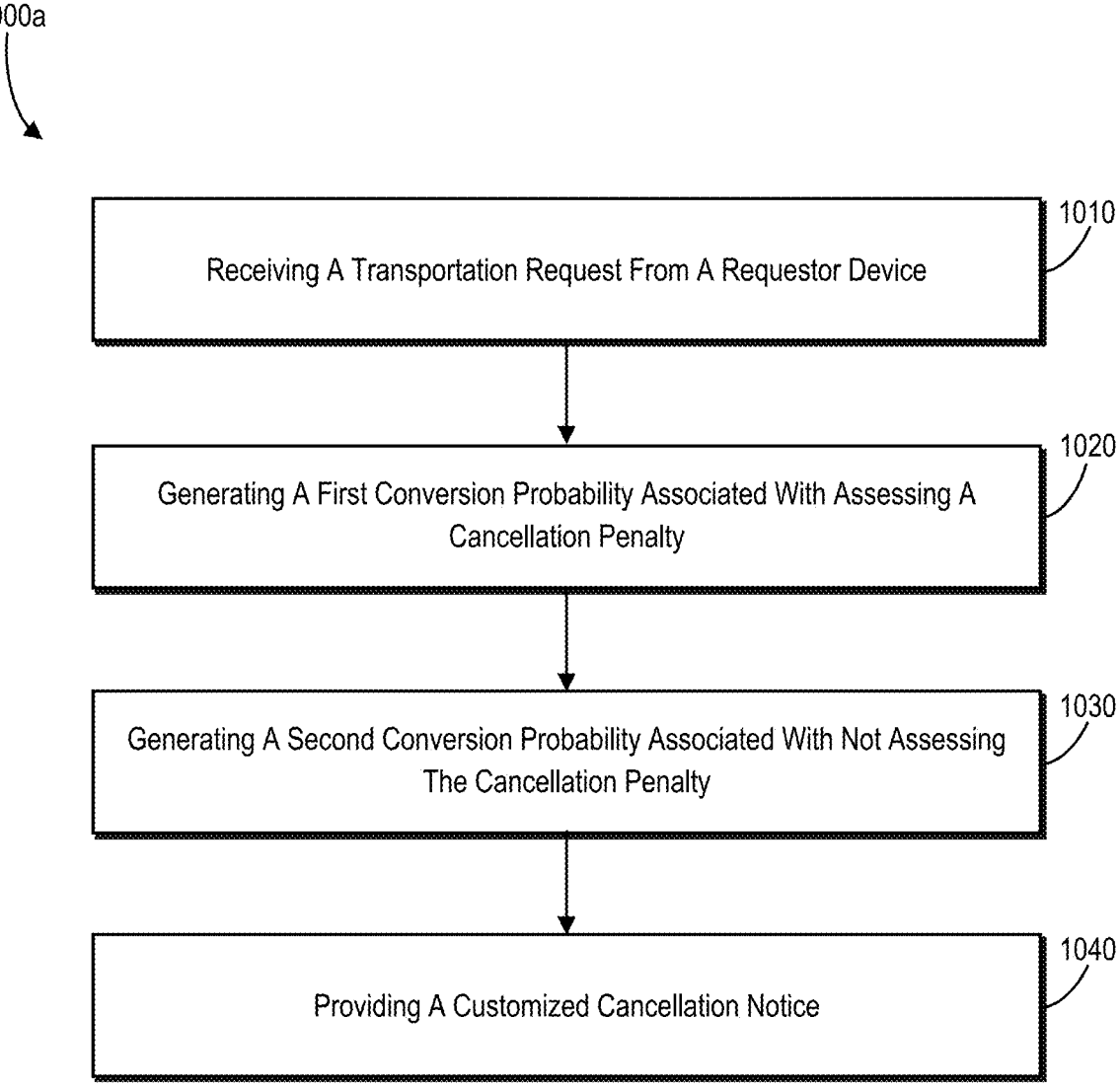

FIGS. 1-9, the corresponding text, and the examples provide several different systems, methods, techniques, components, and/or devices of the cancellation management system 105 in accordance with one or more embodiments. In addition to the above description, FIGS. 10A-10B illustrate respective flowcharts of a series of acts 1000a and 1000b for providing a customized cancellation notice in accordance with one or more embodiments. The cancellation management system 105 may perform one or more acts of the series of acts 1000a and 1000b in addition to or alternatively to one or more acts described in conjunction with other figures. While FIGS. 10A-10B illustrates acts according to two respective embodiments, alternative embodiments may omit, add to, reorder, and/or modify any of the acts shown in FIGS. 10A-10B. The acts of FIGS. 10A-10B can be performed as part of a method. Alternatively, a non-transitory computer-readable medium can comprise instructions that, when executed by one or more processors, cause a computing device to perform the acts of FIGS. 10A-10B. In some embodiments, a system can perform the acts of FIGS. 10A-10B.

As shown in FIG. 10A, the series of acts 1000a includes an act 1010 of receiving a transportation request from a requestor device and an act 1020 of generating a first conversion probability associated with assessing a cancellation penalty. In some cases, for example, the act 1020 includes generating a first conversion probability associated with assessing a cancellation penalty for cancelling the transportation request based on a set of transportation features corresponding to the transportation request.

In some embodiments, the set of transportation features comprise one or more of an estimated time of arrival of a transportation provider at a pickup location of the requestor; an amount of time between the transportation provider accepting the transportation request and the requestor cancelling the transportation request; or a distance between the requestor device and the pickup location. Additionally, or alternatively, in some embodiments, the first conversion probability comprises a requestor-session-conversion probability that a transportation provider transports the requestor to a drop-off location based on one of: the transportation request by the requestor from the requestor device; or a subsequent transportation request within a threshold time period by the requestor from the requestor device.

Further, the series of acts 1000a includes an act 1030 of generating a second conversion probability associated with not assessing the cancellation penalty. In some cases, the act 1030 includes generating a second conversion probability associated with not assessing the cancellation penalty for cancelling the transportation request based on a set of transportation features corresponding to the transportation request.

Additionally, the series of acts 1000a includes an act 1040 of providing a customized cancellation notice. For example, in some embodiments, the act 1040 includes, based on the first conversion probability and the second conversion probability, providing, for display by the requestor device, a customized cancellation notice in response to receiving an indication of a selection to cancel the transportation request from the requestor device. Further, in some embodiments, act 1040 can include providing a notification to the requestor device of the cancellation penalty associated with cancelling the transportation request, or providing a notification to the requestor device that no cancellation penalty will be assessed for cancelling the transportation request.

It is understood that the outlined acts in the series of acts 1000a are only provided as examples, and some of the acts may be optional, combined into fewer acts, or expanded into additional acts without detracting from the essence of the disclosed embodiments. As an example of one or more additional or alternative acts not shown in FIG. 10A, act(s) in the series of acts 1000a may include: generating a feedback probability that a requestor associated with the transportation request submits feedback in response to the cancellation penalty based on one or more of the set of transportation features corresponding to the transportation request. In some embodiments, generating the feedback probability comprises utilizing a requestor-feedback-machine-learning model. Further, in some embodiments, generating the first conversion probability and the second conversion probability comprises utilizing a conversion-machine-learning model. Additionally, in these or other embodiments, providing the customized cancellation notice is based further on the feedback probability.

As another example of one or more additional or alternative acts not shown in FIG. 10A, act(s) in the series of acts 1000a may include: applying a transportation-value metric for the requestor to the feedback probability; and providing, for display by the requestor device, the customized cancellation notice based further on the transportation-value metric for the requestor applied to the feedback probability.

With respect to FIG. 10B, the series of acts 1000b includes an act 1050 of generating a projected transportation route for shared transport of a first requestor and a second requestor. For example, the act 1050 can include generating a projected transportation route for shared transport of a first requestor and a second requestor based on a first shared-transportation request and a second shared-transportation request.

Further, the series of acts 1000b includes an act 1060 of generating a transportation efficiency metric reflecting a modification to the projected transportation route associated with cancelling a first shared-transportation request. In addition, the series of acts 1000b includes an act 1070 of determining, based on the transportation efficiency metric, whether to assess a cancellation penalty for cancelling the first shared-transportation request. Furthermore, the series of acts 1000b includes an act 1080 of providing a customized cancellation notice. For example, in some embodiments, the act 1080 includes, in response to an indication of a selection by the first requestor to cancel the first shared-transportation request, providing, for display by a requestor device of the first requestor, a customized cancellation notice based on determining whether to assess the cancellation penalty for cancelling the first shared-transportation request.

In some embodiments, act 1060 can include determining a first projected value of a transportation provider transporting the first requestor and the second requestor along the projected transportation route; and determining a second projected value of transporting the second requestor along an alternative projected transportation route. In these or other embodiments, the alternative projected transportation route comprises: a first projected transportation route for the transportation provider transporting the second requestor alone and without the first requestor; or a second projected transportation route for the transportation provider transporting the second requestor with a third requestor associated with an additional shared-transportation request.

It is understood that the outlined acts in the series of acts 1000*b* are only provided as examples, and some of the acts may be optional, combined into fewer acts, or expanded into additional acts without detracting from the essence of the disclosed embodiments. As an example of one or more additional or alternative acts not shown in FIG. 10B, act(s) in the series of acts 1000*b* may include: generating a predicted-requestor rating of a transportation experience for the first requestor based on a set of transportation features corresponding to the first shared-transportation request; and providing, for display by the requestor device of the first requestor, the customized cancellation notice based further on the predicted-requestor rating. In some embodiments, the set of transportation features comprises one or more of: an amount of time for matching the first shared-transportation request with a transportation provider; a predicted time or a predicted distance of detour for transport of the first requestor to a drop-off location; or an estimated time of arrival of the transportation provider at a pickup location of the first requestor.

As another example of one or more additional or alternative acts not shown in FIG. 10B, act(s) in the series of acts 1000*b* may include: converting the predicted-requestor rating to a routing weight for the projected transportation route based on the transportation features (e.g., that are predicted to affect the transportation experience for the first requestor); and providing, for display by the requestor device of the first requestor, the customized cancellation notice based further on the routing weight. For example, the cancellation management system may associate the routing weight (e.g., as a bias value or cost metric) with a projected transportation route in order to filter out or otherwise exclude transportation routes in a matching cycle.

As another example of one or more additional or alternative acts not shown in FIG. 10B, act(s) in the series of acts 1000*b* may include: generating a first conversion probability associated with assessing a cancellation penalty for cancelling the transportation request; generating a second conversion probability associated with not assessing the cancellation penalty for cancelling the transportation request; and providing, for display by the requestor device of the first requestor, the customized cancellation notice based further on the first conversion probability and the second conversion probability.

Figure 11:
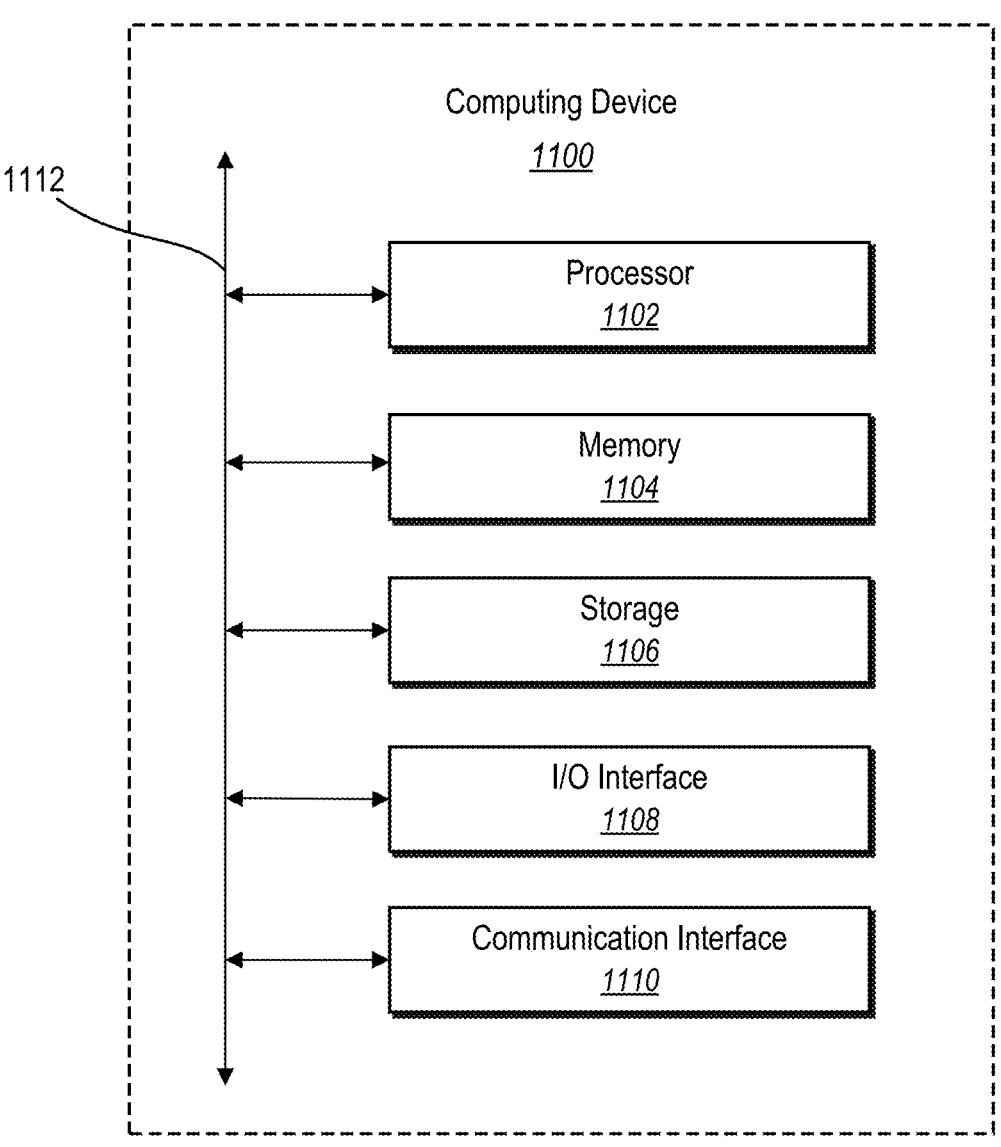
FIG. 11 illustrates a block diagram of an example computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the computing system 900, the server(s) 102, the requestor client devices 116*a*-116*n*, the provider client devices 110*a*-110*n*). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of the computing device 1100 to each other.

Figure 12:
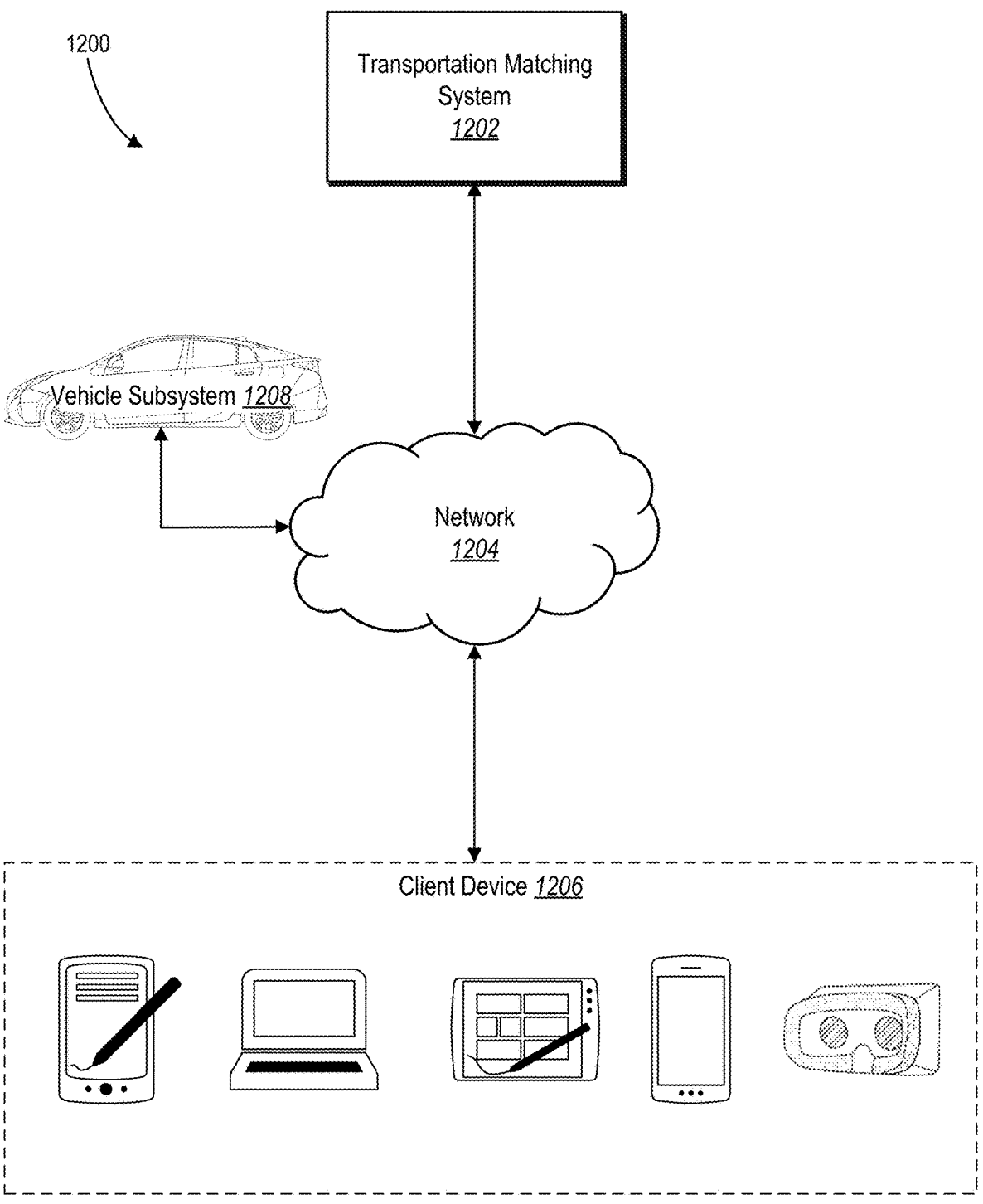
FIG. 12 illustrates an example network environment of a transportation matching system in accordance with one or more embodiments.

FIG. 12 illustrates an example network environment 1200 of a transportation matching system (e.g., the dynamic transportation matching system 104). The network environment 1200 includes a client device 1206, a transportation matching system 1202, and a vehicle subsystem 1208 connected to each other by a network 1204. Although FIG. 12 illustrates a particular arrangement of the client device 1206, the transportation matching system 1202, the vehicle subsystem 1208, and the network 1204, this disclosure contemplates any suitable arrangement of the client device 1206, the transportation matching system 1202, the vehicle subsystem 1208, and the network 1204. As an example, and not by way of limitation, two or more of the client devices 1206, the transportation matching system 1202, and the vehicle subsystem 1208 communicate directly, bypassing the network 1204. As another example, two or more of the client devices 1206, the transportation matching system 1202, and the vehicle subsystem 1208 may be physically or logically co-located with each other in whole or in part. Moreover, although FIG. 12 illustrates a particular number of the client devices 1206, the transportation matching systems 1202, the vehicle subsystems 1208, and the networks 1204, this disclosure contemplates any suitable number of the client devices 1206, the transportation matching systems 1202, the vehicle subsystems 1208, and the networks 1204. As an example, and not by way of limitation, the network environment 1200 may include multiple client devices 1206, the transportation matching systems 1202, the vehicle subsystems 1208, and the networks 1204.

This disclosure contemplates any suitable network 1204. As an example, and not by way of limitation, one or more portions of the network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1204 may include one or more networks 1204.

Links may connect the client device 1206, the transportation matching system 1202, and the vehicle subsystem 1208 to the communication network 1204 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1200. One or more first links may differ in one or more respects from one or more second links.

In particular embodiments, the client device 1206 may be an electronic device including hardware, software, or embedded logic components or a combination of two or more such components and capable of carrying out the appropriate functionalities implemented or supported by the client device 1206. As an example, and not by way of limitation, a client device 1206 may include any of the computing devices discussed above in relation to FIG. 12. A client device 1206 may enable a network user at the client device 1206 to access a network. A client device 1206 may enable its user to communicate with other users at other client devices 1206.

In particular embodiments, the client device 1206 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1206 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1206 one or more Hyper Text Markup Language (HTML) files responsive to the HTTP request. The client device 1206 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1202 may be a network-addressable computing system that can host a ride share transportation network. The transportation matching system 1202 may generate, store, receive, and send data, such as, for example, user-profile data, concept-profile data, text data, ride request data, GPS location data, provider data, requestor data, vehicle data, or other suitable data related to the ride share transportation network. This may include authenticating the identity of providers and/or vehicles who are authorized to provide ride services through the transportation matching system 1202. In addition, the transportation service system may manage identities of service requestors such as users/requestors. In particular, the transportation service system may maintain requestor data such as driving/riding histories, personal data, or other user data in addition to navigation and/or traffic management services or other location services (e.g., GPS services).

In particular embodiments, the transportation matching system 1202 may manage ride matching services to connect a user/requestor with a vehicle and/or provider. By managing the ride matching services, the transportation matching system 1202 can manage the distribution and allocation of vehicle subsystem resources and user resources such as GPS location and availability indicators, as described herein.

The transportation matching system 1202 may be accessed by the other components of the network environment 1200 either directly or via network 1204. In particular embodiments, the transportation matching system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, or a transportation matching system 1202 to manage, retrieve, modify, add, or delete, the information stored in data store.

In particular embodiments, the transportation matching system 1202 may provide users with the ability to take actions on various types of items or objects, supported by the transportation matching system 1202. As an example, and not by way of limitation, the items and objects may include ride share networks to which users of the transportation matching system 1202 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1202 or by an external system of a third-party system, which is separate from the transportation matching system 1202 and coupled to the transportation matching system 1202 via a network 1204.

In particular embodiments, the transportation matching system 1202 may be capable of linking a variety of entities. As an example, and not by way of limitation, the transportation matching system 1202 may enable users to interact with each other or other entities, or to allow users to interact with these entities through an application programming interfaces (API) or other communication channels.

In particular embodiments, the transportation matching system 1202 may include a variety of servers, sub-systems, programs, modules, logs, and data stores. In particular embodiments, the transportation matching system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1202 may also include suitable components such as network interfaces, security mechanisms, load balancers, failover servers, management-and-network-operations consoles, other suitable components, or any suitable combination thereof. In particular embodiments, the transportation matching system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1202 and one or more client devices 1206. An action logger may be used to receive communications from a web server about a user's actions on or off the transportation matching system 1202. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from the client device 1206 responsive to a request received from the client device 1206. Authorization servers may be used to enforce one or more privacy settings of the users of the transportation matching system 1202. A privacy setting of a user determines how particular information associated with a user can be shared. The authorization server may allow users to opt in to or opt out of having their actions logged by the transportation matching system 1202 or shared with other systems, such as, for example, by setting appropriate privacy settings. Third-party-content-object stores may be used to store content objects received from third parties. Location stores may be used for storing location information received from the client devices 1206 associated with users.

In addition, the vehicle subsystem 1208 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1208 can include an autonomous vehicle—i.e., a vehicle that does not require a human operator. In these embodiments, the vehicle subsystem 1208 can perform maneuvers, communicate, and otherwise function without the aid of a human provider, in accordance with available technology.

In particular embodiments, the vehicle subsystem 1208 may include one or more sensors incorporated therein or associated thereto. For example, sensor(s) can be mounted on the top of the vehicle subsystem 1208 or else can be located within the interior of the vehicle subsystem 1208. In certain embodiments, the sensor(s) can be located in multiple areas at once—i.e., split up throughout the vehicle subsystem 1208 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requestor.

In particular embodiments, the vehicle subsystem 1208 may include a communication device capable of communicating with the client device 1206 and/or the transportation matching system 1202. For example, the vehicle subsystem 1208 can include an on-board computing device communicatively linked to the network 1204 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
training a requestor-feedback-machine-learning model utilizing ground-truth requestor device feedback interactions and historical transportation features comprising historical cancellation transmissions;
receiving a transportation request corresponding to a transportation matching system from a requestor device;
receiving, from the requestor device, an indication of a selection to cancel the transportation request;
extracting a set of transportation features corresponding to the transportation request;
generating, from the set of transportation features utilizing the requestor-feedback-machine-learning model, a first requestor device feedback probability that the requestor device will transmit a feedback notification if a cancellation penalty notification comprising a first cancellation penalty amount for cancelling the transportation request is transmitted to the requestor device;
generating, from the set of transportation features utilizing the requestor-feedback-machine-learning model, a second requestor device feedback probability that the requestor device will transmit a feedback notification if a cancellation penalty notification comprising a second cancellation penalty amount for cancelling the transportation request is transmitted to the requestor device; and
based on a comparison of the first requestor device feedback probability and the second requestor device feedback probability, in response to receiving the indication of the selection to cancel the transportation request from the requestor device, providing a customized cancellation notice comprising the first cancellation penalty amount for display on the requestor device.

2. The computer-implemented method of claim 1, wherein training the requestor-feedback-machine-learning model comprises:
generating, utilizing the requestor-feedback-machine-learning model, a requestor device feedback prediction; and
comparing the requestor device feedback prediction with a ground truth requestor device feedback.

3. The computer-implemented method of claim 2, wherein training the requestor-feedback-machine-learning model comprises:
comparing the requestor device feedback prediction with a ground truth requestor device feedback utilizing a loss function to determine a loss; and
modifying parameters of the requestor-feedback-machine-learning model based on the loss.

4. The computer-implemented method of claim 1 wherein extracting the set of transportation features corresponding to the transportation request comprises extracting at least one of:
a number of communications exchanged with the requestor device; or
an amount of time for matching the transportation request with a provider device.

5. The computer-implemented method of claim 1 wherein extracting the set of transportation features corresponding to the transportation request comprises extracting at least one of:
an estimated time of arrival of a provider device at a pickup location of the requestor device;
an amount of requestor device movement after sending the transportation request; or
a predicted amount of detour corresponding to the transportation request.

6. The computer-implemented method of claim 1, further comprising generating, from the set of transportation features utilizing a requestor-experiment-rating-machine-learning model a predicted requestor rating if a cancellation penalty notification for cancelling the transportation request is transmitted to the requestor device.

7. The computer-implemented method of claim 6, further comprising providing the customized cancellation notice based on the first requestor device feedback probability and the predicted requestor rating.

8. The computer-implemented method of claim 1, wherein providing the customized cancellation notice comprises:

providing a first digital notification to the requestor device of a cancellation penalty associated with cancelling the transportation request; or providing a second digital notification to the requestor device that no cancellation penalty will be assessed for cancelling the transportation request.

9. A system comprising:

at least one processor; and at least one non-transitory computer-readable storage medium storing instructions that, when executed by the at least one processor, causes the system to:

train a requestor-feedback-machine-learning model utilizing ground-truth requestor device feedback interactions and historical transportation features comprising historical cancellation transmissions;

receive a transportation request corresponding to a transportation matching system from a requestor device;

receive, from the requestor device, an indication of a selection to cancel the transportation request;

extract a set of transportation features corresponding to the transportation request;

generate, from the set of transportation features utilizing the requestor-feedback-machine-learning model, a first requestor device feedback probability that the requestor device will transmit a feedback notification if a cancellation penalty notification comprising a first cancellation penalty amount for cancelling the transportation request is transmitted to the requestor device;

generate, from the set of transportation features utilizing the requestor-feedback-machine-learning model, a second requestor device feedback probability that the requestor device will transmit a feedback notification if a cancellation penalty notification comprising a second cancellation penalty amount for cancelling the transportation request is transmitted to the requestor device; and based on a comparison of the first requestor device feedback probability and the second requestor device feedback probability, in response to receiving the indication of the selection to cancel the transportation request from the requestor device, provide a customized cancellation notice comprising the first cancellation penalty amount for display on the requestor device.

10. The system of claim 9, further comprising instructions that, when executed by the at least one processor, cause the system to train the requestor-feedback-machine-learning model by:

generating, utilizing the requestor-feedback-machine-learning model, a requestor device feedback prediction;

comparing the requestor device feedback prediction with a ground truth requestor device feedback to determine a loss; and modifying parameters of the requestor-feedback-machine-learning model based on the loss.

11. The system of claim 9, further comprising instructions that, when executed by the at least one processor, cause the system to extract the set of transportation features corresponding to the transportation request by extracting at least one of:

a number of communications exchanged with the requestor device; or an amount of time for matching the transportation request with a provider device.

12. The system of claim 9, further comprising instructions that, when executed by the at least one processor, cause the system to extract the set of transportation features corresponding to the transportation request by extracting at least one of:

an estimated time of arrival of a provider device at a pickup location of the requestor device;

an amount of requestor device movement after sending the transportation request; or a predicted amount of detour corresponding to the transportation request.

13. The system of claim 9, further comprising instructions that, when executed by the at least one processor, cause the system to generate, from the set of transportation features, utilizing a requestor-experiment-rating-machine-learning model, a predicted requestor rating if a cancellation penalty notification for cancelling the transportation request is transmitted to the requestor device.

14. The system of claim 13, further comprising instructions that, when executed by the at least one processor, cause the system to provide the customized cancellation notice based on the first requestor device feedback probability and the predicted requestor rating.

15. A non-transitory computer-readable medium comprising instructions that, when executed by at least one processor, causes a computer system to:

train a requestor-feedback-machine-learning model utilizing ground-truth requestor device feedback interactions and historical transportation features comprising historical cancellation transmissions;

receive a transportation request corresponding to a transportation matching system from a requestor device;

receive, from the requestor device, an indication of a selection to cancel the transportation request;

extract a set of transportation features corresponding to the transportation request;

generate, from the set of transportation features utilizing the requestor-feedback-machine-learning model, a first requestor device feedback probability that the requestor device will transmit a feedback notification if a cancellation penalty notification comprising a first cancellation penalty amount for cancelling the transportation request is transmitted to the requestor device;

generate, from the set of transportation features utilizing the requestor-feedback-machine-learning model, a second requestor device feedback probability that the requestor device will transmit a feedback notification if a cancellation penalty notification comprising a second cancellation penalty amount for cancelling the transportation request is transmitted to the requestor device; and based on a comparison of the first requestor device feedback probability and the second requestor device feedback probability, in response to receiving the indication of the selection to cancel the transportation request from the requestor device, provide a customized cancellation notice comprising the first cancellation penalty amount for display on the requestor device.

16. The non-transitory computer-readable medium of claim 15, further comprising instructions that, when executed by the at least one processor, cause the computer system to train the requestor-feedback-machine-learning model by:

generating, utilizing the requestor-feedback-machine-learning model, a requestor device feedback prediction;

comparing the requestor device feedback prediction with a ground truth requestor device feedback to determine a loss; and modifying parameters of the requestor-feedback-machine-learning model based on the loss.

17. The non-transitory computer-readable medium of claim 15, further comprising instructions that, when executed by the at least one processor, cause the computer system to extract the set of transportation features corresponding to the transportation request by extracting at least one of:

a number of communications exchanged with the requestor device; or an amount of time for matching the transportation request with a provider device.

18. The non-transitory computer-readable medium of claim 15, further comprising instructions that, when executed by the at least one processor, cause the computer system to extract the set of transportation features corresponding to the transportation request by extracting at least one of:

an estimated time of arrival of a provider device at a pickup location of the requestor device;

an amount of requestor device movement after sending the transportation request; or a predicted amount of detour corresponding to the transportation request.

19. The non-transitory computer-readable medium of claim 15, further comprising instructions that, when executed by the at least one processor, cause the computer system to: generate, from the set of transportation features, utilizing a requestor-experiment-rating-machine-learning model, a predicted requestor rating if a cancellation penalty notification for cancelling the transportation request is transmitted to the requestor device.

20. The non-transitory computer-readable medium of claim 19, further comprising instructions that, when executed by the at least one processor, cause the computer system to provide the customized cancellation notice based on the first requestor device feedback probability and the predicted requestor rating.

* * * * *